US008605406B2

(12) United States Patent
Jendrejack et al.

(10) Patent No.: US 8,605,406 B2
(45) Date of Patent: Dec. 10, 2013

(54) APPARATUS AND METHODS FOR ALTERING CHARGE ON A DIELECTRIC MATERIAL

(75) Inventors: Richard M. Jendrejack, Hudson, WI (US); Robert A. Yapel, Oakdale, MN (US); Mitchelle A. F. Johnson, Maplewood, MN (US); Mikhail L. Pekurovsky, Bloomington, MN (US); Peter T. Benson, North St. Paul, MN (US); Joan M. Noyola, Maplewood, MN (US); William B. Kolb, West Lakeland, MN (US); Matthew S. Stay, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 813 days.

(21) Appl. No.: 12/808,706

(22) PCT Filed: Dec. 16, 2008

(86) PCT No.: PCT/US2008/086982
§ 371 (c)(1),
(2), (4) Date: Jun. 17, 2010

(87) PCT Pub. No.: WO2009/085751
PCT Pub. Date: Jul. 9, 2009

(65) Prior Publication Data

US 2011/0192977 A1 Aug. 11, 2011

Related U.S. Application Data

(60) Provisional application No. 61/015,967, filed on Dec. 21, 2007.

(51) Int. Cl.
*H02H 1/00* (2006.01)

(52) U.S. Cl.
USPC .......... 361/212

(58) Field of Classification Search
USPC .......... 361/213, 229, 212
See application file for complete search history.

(56) References Cited

U.S. PATENT DOCUMENTS 2,952,559 A 9/1960 Nadeau
2,967,119 A 1/1961 Gutterman (Continued)

FOREIGN PATENT DOCUMENTS

JP 52-069291 6/1977

OTHER PUBLICATIONS

Barry, "Printing Nanoparticle Building Blocks from the Gas Phase Using Nanoxerography", App. Phys. Letters, Dec. 29, 2003, vol. 83, No. 26, pp. 5527-5529.

(Continued)

*Primary Examiner* — Ronald W Leja
(74) *Attorney, Agent, or Firm* — Julie Lapos-Kuchar; James A. Baker

(57) ABSTRACT

Methods of altering charge on a dielectric material involve application of an at least weakly conductive liquid to at least a portion of the dielectric material. The liquid is then at least partially removed from the dielectric material leaving a substantially uniform electrostatic charge on at least the portion of the dielectric material. Some methods provide a dielectric material that is both net neutral and completely neutral. Other methods generate a charge pattern that is used for subsequent processing.

20 Claims, 21 Drawing Sheets

(56) References Cited

U.S. PATENT DOCUMENTS

| | | | | |
|---|---|---|---|---|
| 3,204,247 | A | 8/1965 | Barnes | |
| 3,462,286 | A | 8/1969 | De Geest | |
| 3,730,753 | A | 5/1973 | Kerr | |
| 3,806,355 | A * | 4/1974 | Kaufman | 427/466 |
| 3,921,179 | A | 11/1975 | Weerstra | |
| 4,291,226 | A * | 9/1981 | Rueggeberg | 250/324 |
| 5,777,576 | A | 7/1998 | Zur | |
| 6,176,245 | B1 | 1/2001 | Takahashi | |
| 6,231,679 | B1 | 5/2001 | Mandai | |
| 7,476,352 | B2 | 1/2009 | Wilson | |
| 2004/0085705 | A1 | 5/2004 | Zaretsky | |
| 2005/0123687 | A1 | 6/2005 | Jacobs | |
| 2011/0192977 | A1 * | 8/2011 | Jendrejack et al. | 250/326 |

OTHER PUBLICATIONS

Barry, "Charging Process and Coulomb-Force-Directed Printing of Nanoparticles with Sub-100-nm Lateral Resolution", Nano Letters, 2005, vol. 5, No. 10, pp. 2078-2084.

Fudouzi, "Assembly of Microsized Colloidal Particles on Electrostatic Regions Patterned through Ion Bean Irradiation", Langmuir, 2002, vol. 18, No. 20, pp. 7648-7652.

Gutoff, "Coating and Drying Defects: Troubleshooting Operating Problems", John Wiley & Sons, 1995.

Hull, "A Method for Studying the Distribution and Sign of Static Charges on Solid Materials", Journal of Applied Physics, Dec. 1949, vol. 20, pp. 1157-1159.

Krinke, "Positioning of Nanometer-sized Particles on Flat Surfaces by Direct Deposition from the Gas Phase", App. Phys. Letters, Jun. 4, 2001, vol. 78, No. 23, pp. 3708-3710.

Lowell, "Contact Electrification", Advances in Physics, 1980, vol. 29, No. 6, 947-1023, p. 956.

Melcher, "Electrohydrodynamics: A Review of the Role of Interfacial Shear Stresses", Annual Review of Fluid Mechanics, 1969, pp. 111-146.

Mesquida, "Attaching Silica Nanoparticles from Suspension onto Surface Charge Patterns Generated by a Conductive Atomic Force Microscope Tip", Adv. Mater. Sep. 14, 2001, vol. 13, No. 18, pp. 1395-1398.

Naujoks, "Micro- and Nanoxerography in Liquids—Controlling Pattern Definition", Microelectronic Engineering, 2005, vol. 78-79, pp. 331-337.

Saville, "Electrohydrodynamics: The Taylor-Melcher Leaky Dielectric Model", Annual Review of Fluid Mechanics, Jan. 1997, vol. 29, pp. 27-64.

International Search Report for PCT/US2008/086982, 4 pgs.

Written Opinion of the ISA for International Application No. PCT/US208/086982, 10 pgs.

* cited by examiner

APPARATUS AND METHODS FOR ALTERING CHARGE ON A DIELECTRIC MATERIAL

CROSS REFERENCE TO RELATED APPLICATIONS

This application is a national stage filing under 35 U.S.C. 371 of PCT/US2008/086982, filed Dec. 16, 2008, which claims priority to U.S. Provisional Application No. 61/015,967, filed Dec. 21, 2007, the disclosure of which is incorporated by reference in its/their entirety herein.

TECHNICAL FIELD

The present disclosure relates to methods and systems for neutralizing or otherwise altering the charge on a dielectric material, such as a polymeric web.

BACKGROUND

Neutralization

Generation of electrostatic charge on webs (e.g., polymeric webs) occurs frequently in web handling operations, where the web moves over and around various rollers, bars, and other web handling equipment. Electrostatic charge on webs arises from many causes, including the contact and separation of the web from the various rolls and equipment, unwinding/winding rolls of film and exposure of the web to E-beam or corona treatment (AC or DC). Charge in/on the web may also be present from previous processes, such as electrostatic pinning of the film during casting. Electrostatic charges on a web can be detrimental in the area of precision coating, not only because of spark ignition hazards, but also because these electrostatic charges can cause a subsequently coated liquid layer to be disrupted and form undesirable patterns (see, for example, "Coating & Drying Defects", Gutoff and Cohen, Wiley, NY, 1995). In addition to inhomogeneous charge patterns, homogeneous charge can also generate coating defects.

In the photographic industry, for example, a significant non-uniform thickness distribution of a photographic coating material often results when such material is applied to a randomly charged web. Because of the high surface resistivity of high dielectric materials, such as polyester based materials and the like, used in photographic film, it is fairly common to have relatively high electrostatic charge, of varying intensity and polarity, occupying web areas closely adjacent one another. The use of such coating materials as a component of a photographic positive or negative, for example, often requires the use of relatively thick coatings to provide at least a minimum thickness coating throughout the web and thereby compensate for such non-uniform thickness distribution which necessarily results in an increase in the use of relatively costly photographic coating materials in order to produce an effective coating thickness. Visual effects such as photographic mottle are also a consequence of coating non-uniformly charged webs with photographic coating materials. Past practices included either tolerating this non-uniform charge distribution and its disadvantages or attempting to neutralize a randomly charged web as much as possible prior to applying the photographic coating materials.

Various techniques for neutralizing charged webs are known.

A technique described in U.S. Pat. No. 2,952,559 involves passing a charged web between a pair of opposed grounded pressure rollers that are spring-force biased against opposite web surfaces for the purpose of neutralizing bounded or polarization-type electrostatic charges and then blowing ionized air onto surfaces of the web to first neutralize surface charges and then establish a particular web surface charge level prior to coating same. This resulting surface charge level is compensated for by applying a voltage to the coating applicator during the actual coating process having a polarity that is opposite to that of the web surface charge.

Another technique, described in U.S. Pat. No. 3,730,753, involves "flooding" a web surface with charged particles of a first polarity so as to generally uniformly charge the surface and thereafter removing the charge imparted to said web surface so as to leave the surface generally free of charge. The amount of charge added to and/or the amount of charge removed from the web surface may be so controlled that the charge variation and the net charge on the surface is lowered to an acceptable level.

In addition to the methods referenced above, there are also commercially-available neutralization systems, such as:

Air ionizers, which provide a source of ionized air. Air naturally contains ions. However, these ions are not sufficiently abundant in most cases to neutralize static charges rapidly enough to protect static sensitive devices. Further, air ions are removed by HEPA and ULPA filters in clean rooms.

Electrical Static Eliminators, which consist of one or more electrodes and a high voltage power supply. Ion generation from electrical static eliminators occurs in the air space surrounding the high voltage electrodes. These ions are then attracted to the static charge on the material, resulting in neutralization. There are various commercial sources for electrical static eliminators, such as MKS Ion Systems and Simco (an Illinois Tool Works company).

Induction Static Eliminators, which are passive devices where neutralizing ions are generated in response to the electric field due to the static charge on the material. Examples of common induction static eliminators include STATIC STRING™, tinsel, needle bars, and brushes.

Nuclear Static Eliminators, which create ions by the irradiation of air molecules. Most models use an alpha particle emitting isotope to create ion pairs to neutralize static charges. These are often also called Nuclear Bars.

Each of these commercially-available neutralization systems provide a means to attain a web that is net neutralized (i.e. such that the magnitude of electric field, as measured with a common static meter, is substantially lower than it was initially, provided the initial charge was substantial). However, the net neutralized web may still have substantial charge.

The use of liquids to neutralize static charge on dielectrics has also been mentioned. The basic idea of neutralizing charge on dielectric materials by exposing the material to at least weakly conductive fluids with a path to ground has been mentioned in the literature (see, for example, page 956 of J. Lowell and A. C. Rose-Innes, Advances in Physics, 1980, Vol. 29, No. 6, 947-1023). For example, U.S. Pat. No. 6,176,245 B1 describes a web cleaning and destaticizing apparatus which removes cleaning solution at a front slot and supplies an undercoat from a back slot. The undercoat is applied in particular to eliminate static generated by the scraping off of the cleaning solution at the front slot. U.S. Pat. No. 6,176,245 B1 places no explicit requirements the electrical conductivity of the destaticizing undercoat, although the example given in U.S. Pat. No. 6,176,245 B1 described a solution containing 88% methyl ethyl ketone, a weakly conductive solution. Also, U.S. Pat. No. 6,176,245 B1 does not explicitly state that the liquid must provide a path to ground, although it is likely that the slotted web cleaning and destaticizing apparatus used in their experiment was made of a conductive material such as a metal. The apparatus is limited to treatment of the same side of the web from which the cleaning solution was removed. There is no discussion regarding the type of charge distributions which would be remediated using the apparatus.

U.S. Pat. No. 6,231,679B1 describes a process using a similar apparatus as described in U.S. Pat. No. 6,176,245 B1. As with U.S. Pat. No. 6,176,245 B1, fluid conductivity or ground path requirements are not discussed. There is no discussion regarding the type of charge distributions which would be remediated using the apparatus.

An older patent, U.S. Pat. No. 2,967,119, describes an ultrasonic process and apparatus that may be used to ultrasonically clean and nonevaporatively dry (e.g. air knifing off the remaining fluid) a continuous film. A purpose of U.S. Pat. No. 2,967,119 is to clean the film, but U.S. Pat. No. 2,967,119 teaches that a further feature of the drier operation is that the film leaves the dryer free of electrostatic charge. This decharging effect is added in several claims, always in conjunction with the nonevaporative drying step. No insight as to the necessary level of fluid conductivity is given in U.S. Pat. No. 2,967,119, and no data is offered that conclusively demonstrates that the destaticizing actually occurs in the drier, rather than in the ultrasonic tank. Furthermore, U.S. Pat. No. 2,967,119 does not specify the types of charge distributions that are addressed by the process and apparatus.

U.S. Pat. Nos. 6,176,245 B1, 6,231,679B1, and 2,967,119 describe the use of liquids to achieve neutralization, but are not directed to dual-side or bipolar charge distributions.

Commercially-available methods for elimination of non-trivial static charge distributions. These charge distributions can cause significant defects in final products.

Generation of a Patterned Charge Distribution on Dielectric Surface:

Charge patterns on a substrate can be used for controlled deposition of material to the charge pattern. The "xerox" method is a familiar example of this process. In the xerox method a photoconductor cylinder is uniformly charged. A light is then used to discharge areas of the photoconductor, leaving an electrostatic pattern. Toner particles are then preferentially attracted to the charged regions on the photoconductor, creating a toner pattern on the photoconductor cylinder. The toner pattern is then transferred to another substrate (such as paper) and fused to set the image on the finished product. There are variations on the xerox method which have been applied to copy machines and laser printers. However, these traditional xerography methods rely on photoconductors which are prone to charge diffusion (line blurring) and decay, and are not able to be charge-patterned robustly on the micrometer length scale and below.

In an attempt to circumvent the limitations of photoconductors, methods have been developed to generate micro- and nano-charge patterns directly on the substrate. These fine charge patterns can then be used to guide deposition of particles to generate micro- or nano-scale features on the substrates. For example, Heiko Jacobs' group from the University of Minnesota has a series of publications (C. R. Barry, J. Gu, and H. O. Jacobs, Nano Letters 5 (10) (2005) 2078; H. O. Jacobs and C. Barry, Patent Application US20050123687 (A1)) in which they use "nano-xerography" to create fine charge patterns on an electret substrate to which silver nanoparticles are deposited. In that work, the charge patterns are achieved by direct contact of a charged tool. The tool was created on silicone using lithography and made conductive by plating with gold. The authors claim that silicon stamp features as small as 10 nm can be created which would allow sub-100 micron patterning capability.

All xerography methods, including "micro-xerography" and "nano-xerography", rely on the ability to generate controlled charge patterns on a substrate. Reported methods of generating charge patterns on the micro- and nano-scale through direct contact charging include the use of atomic force microscopy probes (P. Mesquida, A. Stemmer, Adv. Mater. 13 (18) (2001) 1395; N. Naujoks, A. Stemmer, Microelectronic Engineering 78-79 (2005) 331), stainless steel needles (T. J. Krinke et al, App. Phys. Letters 78 (2001) 3708) or nano-stamps (C. R. Barry, N. Z. Lwin, W. Zheng, and H. O. Jacobs, App. Phys. Letters, 83 (26) (2003) 5527). In addition to these direct contact methods, micro- or nano-scale charge patterns have also been generated using focused ion and electron beams (H. Fudouzi et al, Langmuir 18 (2002) 7648).

The methods of generating controlled charge patterns mentioned above have been able to address the feature size limitations of standard xerography techniques which relied on the charging and discharging photoconductor material. However, the methods mentioned above are generally very slow and/or require the use of special substrates (electrets, for example) to achieve the fine, sharp features demonstrated in the literature.

Another challenge in the area of nano- and micro-xerography is adherence of the final pattern to the substrate. The background mentioned above provides a method of placing charge patterns on dielectric (or electret) substrates which can then be used to guide deposition of a second material. Once the second material (i.e. nanoparticles) is deposited, the issue of adherence must be addressed. For example, this may be done using heat and/or pressure.

SUMMARY

The present disclosure is directed to apparatus and methods that eliminate or modify a charge distribution on a dielectric material. In some embodiments, the apparatus and methods of this disclosure modify the charge distribution on a dielectric material through contacting at least a portion of the surface or surfaces of the dielectric (e.g. a web) with a liquid that is at least weakly conductive and held at a prescribed potential.

One aspect is a method of modifying charge on a dielectric material, the method comprising obtaining a dielectric material having a substantially non-uniform electrostatic charge distribution on a surface, the electrostatic charge distribution measured relative to a ground potential; applying an at least weakly conductive liquid to the surface of the dielectric material; and at least partially removing the at least weakly conductive liquid from the surface leaving a substantially uniform electrostatic charge on the surface.

Another aspect is a method of generating an electrostatic charge pattern on a dielectric material, the method comprising: obtaining a dielectric material having a first charge potential; applying an at least weakly conductive liquid to a first portion of the dielectric material, the at least weakly conductive liquid having a second charge potential; and at least partially removing the liquid from the first portion of the dielectric material leaving a substantially uniform electrostatic charge on the first portion of the dielectric material.

Yet another aspect is a method for neutralizing an elongate web of dielectric material, the method comprising electrically coupling an at least weakly conductive liquid to a ground potential; obtaining a dielectric material having a charge potential that is not entirely substantially equal to the ground potential; immersing a portion of the continuous web in the liquid to completely cover the portion of the elongate web to neutralize charge on the elongate web; removing the portion of the continuous web from the liquid; and at least partially drying the liquid from the continuous web after immersing.

In some embodiments, the liquid is a common solvent held at ground potential while uniformly contacting both sides of the dielectric web simultaneously. The solvent is then symmetrically removed from the two sides of the web employing non-evaporative and/or evaporative methods. In these embodiments, not only is the final web net neutral, but generally is also dual-side neutral.

In some embodiments, the liquid is a common solvent held at ground potential while uniformly contacting a first side of a dielectric web which has an at least weakly conducting second side which is effectively grounded. The solvent is then symmetrically removed from the first side of the web employing non-evaporative and/or evaporative methods. In these embodiments, not only is the final web net neutral, but generally is also dual-side neutral.

In some embodiments, the liquid is a common solvent held at non-zero potential while uniformly contacting both sides of the dielectric web simultaneously. The solvent is then symmetrically removed from the two sides of the web employing non-evaporative and/or evaporative methods. In these embodiments, both sides of the final web are generally uniformly charged.

In some embodiments, the liquid is a common solvent held at non-zero potential while uniformly contacting a first side of a dielectric web, the second side of which is at least weakly conducting and effectively grounded. The solvent is then symmetrically removed from the first side of the web employing non-evaporative and/or evaporative methods. In these embodiments, the first side of the final web is generally uniformly charged.

In some embodiments, a first liquid held at a first potential is made to uniformly contact a first side of a dielectric web, while the second side of the dielectric web is held at a second potential by, for example, by contact with a second liquid held at a second potential. The solvent is then removed from both sides of the web employing non-evaporative and/or evaporative methods. In these embodiments, not only is the final web net charged, but generally is also dual-side charged.

In some embodiments, a first liquid held at a first potential is made to uniformly contact a first side of a dielectric web, while the second side of the dielectric web is held at a second potential by, for example, by contact with a conductive object. In these embodiments, not only is the final web net charged, but generally is also dual-side charged.

In some embodiments, a first liquid held at a first potential is made to non-uniformly contact (e.g. through the use of a patterned tool) a first side of a dielectric web, while the second side of the dielectric web is held at a second potential by, for example, contact with a second liquid held at a second potential. The solvent is then removed from the two sides of the web employing non-evaporative and/or evaporative methods. In these embodiments, not only does the final web have a net charge pattern, but generally also has a dual-side charge pattern.

In some embodiments, a first liquid held at a first potential is made to non-uniformly contact (e.g. through the use of a patterned tool) a first side of a dielectric web, while the second side of the dielectric web is held at a second potential by, for example, contact a conductive object. The solvent is then removed from the first side of the web employing non-evaporative and/or evaporative methods. In these embodiments, not only does the final web have a net charge pattern, but generally also has a dual-side charge pattern.

In some embodiments, the liquid is a common solvent held at ground potential while non-uniformly contacting (e.g. through the use of a patterned tool) a first side of a dielectric web which has an at least weakly conducting second side which is effectively grounded. The solvent is then removed from the first side of the web employing non-evaporative and/or evaporative methods. In these embodiments, the final web generally has a patterned charge distribution on the first side of the web.

In some embodiments, the liquid is curable (e.g. acrylate solution) and is cured in place rather than removed. In these embodiments, not only does the final web generally have either a uniform or patterned charge distribution, but also has solidified material remaining.

In some embodiments, the present disclosure is directed to apparatus and methods that eliminate or modify a charge distribution on a moving web. In many embodiments, the apparatus and methods of this disclosure provide a web that is net neutral. In these embodiments, not only is the web net neutral, but generally is also dual-side neutral.

In accordance with this disclosure, the present apparatus and methods contact the web to be neutralized with a liquid solvent that has a least some conductivity. The word solvent is used to refer to a liquid which wets the web, and does not necessarily imply the solvation of any particular chemical species. The solvent is brought into contact with both sides of the web, usually simultaneously. The solvent could be applied by any suitable means, such as immersion (e.g., dipping into a pool or bath), simultaneous coating onto both sides, applying wicks or cloths saturated simultaneously to both sides of the web, absorption/adsorption or condensation of vapor onto the web surface, etc. The solvent is then removed and/or dried, employing evaporatative and/or non-evaporative means. Non-evaporative methods includes the use of a physical device such as a wick, air knife, squeegee, etc. to remove at least some of the solvent. Additionally or alternately, at least some of the solvent could be evaporatively removed from the web, and the evaporation may be enhanced by methods such as air convection, heating, etc. The preferred resulting web is both net neutralized and dual-side neutralized, as defined below.

In one particular embodiment, this disclosure is directed to a method of providing a neutral charge on a web. The method includes applying a liquid solvent with at least some conductivity to both sides of a web. The web may be a moving web.

In another particular embodiment, this disclosure is directed to an apparatus for providing a neutral charge on a web. The apparatus includes web handling equipment, such as rollers, nips, etc., and a charge modification station, which includes a source of liquid solvent with at least some conductivity. The charge modification station, and the method of using it, is particularly suited to be easily added to an existing web handling process.

Figure 1:
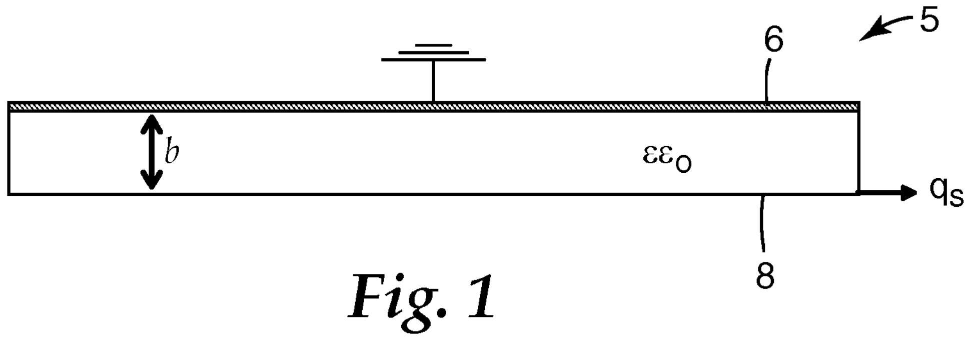
FIG. 1 is a schematic illustration of a web with a grounded conductive backing on a first side and a surface charge on the opposite side.

These and various other features which characterize the apparatus and methods of this disclosure are pointed out with particularity in the attached claims. For a better understanding of the apparatus and methods of the disclosure, their advantages, their use and objectives obtained by their use, reference should be made to the drawings and to the accompanying description, in which there is illustrated and described preferred embodiments according to the present disclosure.

DETAILED DESCRIPTION

The present disclosure is directed to methods that provide an item that is dual-side neutral or bipolar neutral (not just net neutral), and preferably, an item that has both surfaces neutral. Examples of materials for the items to be neutralized according to this disclosure include dielectric materials (e.g., polyester, polyethylene, polypropylene), cloths (e.g. nylon), papers, laminates, glass, and the like. The items may include a conductive layer or an antistatic layer. The surface to be neutralized may have regions that are insulating, antistatic and/or conductive; these regions may be purposely intended or not. The apparatus and methods of this disclosure are particularly suited for items that include a dielectric material. In some embodiments, the item is a web. By use of the term "web" herein, what is intended is a web of sheet stock, having an extended length (e.g., greater than 1 m, usually greater than 10 m, and often greater than 100 m), a width (e.g., between 0.25 m to 5 m), and a thickness (e.g., 3-1500 micrometers, e.g., up to 3000 micrometers). In other embodiments, the item is a discrete or individual item, rather than an extended length. For example, a sheet or page of material might have e.g., a length of 0.5 meter and a width of 0.5 meter. Discrete items may be general planar or have a three-dimensional topography.

Commercially-available neutralization systems are known to provide means to attain webs that are net neutralized (i.e., the magnitude of electric field, as measured with a common static meter is substantially lower than it was initially, provided the initial charge was substantial). However, the net neutralized web may still have substantial charge.

For example, a web in a freespan with a sinusoidal surface charge distribution of mean zero, amplitude $A_s$ and spatial period $X_s$, will have a field above or below the web arising from the surface charge distribution that decays rapidly, and the web will appear to be neutral when measured by a static meter located a distance of several periods ($X_s$) away from the web. The web will appear neutral even though the actual rms value of surface charge may be quite large.

There are many other situations where a web can appear to be neutral when measured with standard electrostatic sensors, and yet have a substantial charge distribution. These charge distributions can cause defects in web-based processes such as coating and drying, and a method is needed for neutralizing these charge distributions to a level such that defects are reduced or eliminated. The level to which these charge distributions must be neutralized is a function of the process (e.g., line speed, coating and drying methods), materials (e.g., coating solution, film composition, construction and thickness) and the particular defect in question. For example, commercial neutralizers are sufficient for eliminating arcing defects, but not for eliminating some coating and drying defects. The methodology of this disclosure is targeted at eliminating or modifying charge distributions such that coating and/or drying defects are reduced, and/or web cleanliness is enhanced. Additionally, by neutralization of the undesirable charge distribution on the item, downstream equipment that includes tight clearance can be readily used. For example, such a neutralized item has less of a tendency to touchdown, for example, in a gap dryer.

In this description, we refer to "net charge", or "polar charge", and "single side charge", or "bipolar charge", when discussing charge distributions on dielectric web. Net charge is defined as the apparent charge per unit area on a dielectric web as inferred from using a fieldmeter to measure field with the web in a free-span (far from other objects). The gap between the fieldmeter and web is typically about 0.5-2 inches (about 1.27 cm-5 cm). The static measurement thus obtained is a function of the charge distribution over the spot size of the measuring probe, which would typically be an area with diameter on the order of an inch. The charge measured in this way is also referred to as polar charge. "Net neutralization" refers to the reduction of the magnitude of net charge, or polar charge, on a web. A low net charge measurement does not imply that the charge distribution over the spot size area is everywhere low, but rather that some average of the charge distribution over the spot size area is low. The sinusoidal charge distribution described above would manifest itself as having a low net or polar charge if the period of the distribution was much shorter than the spot size diameter.

"Single-side charge" is the apparent charge per unit area inferred from using a fieldmeter or voltmeter to measure the field above or the potential of one surface of the web while the other surface of the web is adjacent to or preferably contacting a grounded conductor. The gap between the fieldmeter or voltmeter and the web surface is usually 0.5-5.0 millimeters. The static measurement thus obtained is a function of the charge distribution over the spot size of the measuring probe, which is typically an area with diameter on the order of a millimeter. A charge distribution that results in no substantial net charge, but does result in a substantial single-side charge, is sometimes referred to a "bi-polar charge distribution". "Single-side neutralization" or "bipolar charge neutralization" refers to the reduction of the magnitude of single-side charge or bipolar charge on a web. A low single-side charge measurement does not imply that the charge distribution over the spot size area is everywhere low, but rather some average of the charge distribution over the spot size area is low. The sinusoidal charge distribution described above would appear to have a low single-side or bipolar charge if the period of the distribution was much shorter than the spot size diameter of the measuring device.

As another simple example of bi-polar charge, consider a dielectric web with a uniform charge distribution, $q_s$, on one surface and a uniform charge distribution, $-q_s$, on the opposite surface. In free span, the net charge or polar charge measurement would be zero (because the sum of the top and bottom charge is zero). The single side charge measurement would yield either $-q_s$ or $+q_s$, depending on which side was placed down on a grounded object. A commercial neutralizer would have little impact on this bi-polar charge, as the web is already net neutral.

As another example of a bipolar charge distribution, consider a web with a sinusoidal charge distribution with a non-zero mean, $p(x)=A_s \sin(2\pi x/X_p)+q_s$, on one surface and a charge distribution of −p(x) on the opposite surface. If the net charge measurement in the free span is performed using a spot size with diameter greater than several $X_p$, the web will appear to have no substantial net charge. A single-side charge measurement scan performed using a spot size with diameter larger than several $X_p$ would yield either $+q_s$ or $-q_s$, depending on which surface was placed against the grounded object. If a single-side measurement scan were performed using a spot size diameter much smaller than $X_p$, the sinusoidal nature of the single-side charge would be revealed.

As yet another example of a bipolar charge distribution, consider a web with a random charge distribution R(x) on one side and −R(x) on the other side. The first and second moments of R(x) converge to $+q_s$ and $A_s$, respectively, when integrated over a spot size $X_s$. If the net charge measurement in the free span is performed using a spot size with diameter much greater than $X_s$, the web will appear to have no substantial net charge. A single-side charge measurement scan performed using a spot size with diameter much larger than $X_s$ would yield a constant single side charge, $+q_s$ or $-q_s$, depending on which surface was placed against the grounded object. If a single-side measurement scan were performed using a spot size diameter much smaller than $X_s$, the random nature of the single-side charge would be revealed.

An initially charged dielectric web is considered "dual-side neutralized" if both the net charge or polar charge, and the single-side charge or bipolar charge, have been reduced to a desirable level. Note that the terms "net charge" and "single-side charge" are defined through electrostatic measurements, and do not imply nor require knowledge of the particular locations or magnitudes of the actual charge distributions. The charge distributions may exist on the surface of the dielectric or be internal to the dielectric or both. More sensitive electrostatic sensing probes (e.g. atomic force microscopy probes) than those mentioned above (with smaller spot sizes than mentioned above) may be used to infer net charge or polar charge, and single-side charge or bipolar charge, at finer length scales, depending on the sensitivity desired.

Methods described in this document provide for the reduction of both polar and bipolar charge on webs at least on the length scales discussed above, but including smaller length scales that may not be readily detectable using standard electrostatic measurement equipment. The term "neutralization" does not imply that all charge has been completely eliminated, as there may be, for example, residual charge that generates external fields too weak to cause defects, or that, for example, a double layer has been formed that essentially weakens the external field to a level that brings defects into an acceptable range, or that, for example, the length scale of the remaining bipolar charge distribution is small enough so that defects associated with the original bipolar charge distribution have been reduced or eliminated.

FIG. 1 illustrates an isolated web with one grounded side and a uniform surface charge, $q_s$, on the other side. Web 5 of FIG. 1 has a first side 6 and an opposite second side 8 with a thickness b therebetween. Side 6 is grounded, such as by any suitable element that can be positioned in sufficiently close proximity to or in contact with side 6. In many processes, side 6 is grounded via contact with equipment of a web handling process, such as a roll, that is grounded. In some embodiments, the grounding of side 6 could be via a conductive coating or layer of the web itself. The potential at side 8 of web 5 is given by:

$$\phi_s = \frac{bq_s}{\varepsilon\varepsilon_o} \tag{1}$$

where $\in_o$ and $\in$ are the electric permittivity of free space and relative permittivity of the web, respectively. For isolated web 5, the electric field outside web 5 is zero, while the electric field inside the web is given by:

$$E_w = -\frac{q}{\varepsilon\varepsilon_o} \tag{2}$$

As an example, for a case with surface charge $q_s=10^{-5}$ C/m$^2$, $\in=5$ and b=0.002 inch (about 0.051 mm), the potential at side 8 in free span is $\phi_s=11.5$ V, and the field within web 5 is $E_w=226$ kV/m. The voltage of web 5 as measured with a fieldmeter at a 1 inch (about 25 mm) gap is 11.5 V. Since the field outside the isolated web is zero everywhere, standard neutralizing devices would have very little impact on the surface charge.

FIG. 1 and the associated discussion above is just one very simple example of a bipolar charge distribution that cannot be readily neutralized using commercial ionizers. Isolated web 5 shown in FIG. 1 has no field lines external to web 5 because of being grounded on side 6. Commercial ionizing neutralizers, such as those discussed in the Background, rely on the field emanating from or terminating at a charged web to pull in ions for neutralization. Since there is no field external to isolated web 5 shown in FIG. 1, commercial ionizing neutralization devices are not effective at reducing what may be a substantial charge on web 5. Additionally, there are many other forms of bipolar charge distributions that cannot be readily neutralized using commercial ionizers. The methods described in this disclosure can be used to neutralize many problematic bipolar charge distributions that cannot be neutralized using commercial or previously known neutralizing devices.

Figure 2:
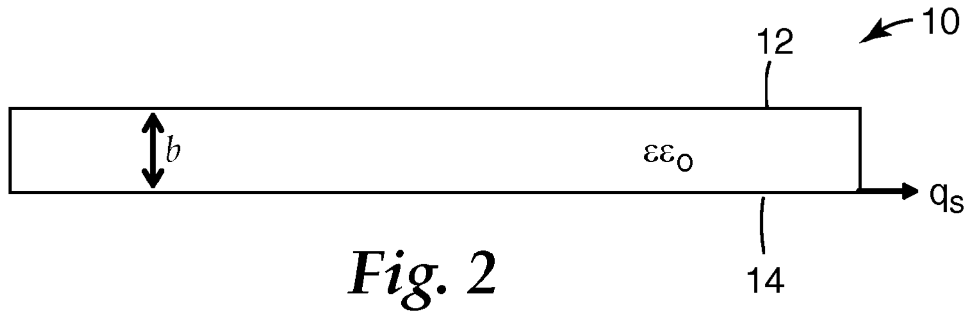
FIG. 2 is a schematic illustration of a web with no conductive component and a surface charge on one side.

Compare the above situation with FIG. 2, which illustrates a web with no grounded side. In FIG. 2, web 10 has a first side 12 and an opposite second side 14 with a thickness b therebetween. For an exemplary case where $q_s=10^{-5}$C/m$^2$, the magnitude of the electric field outside of isolated web 10 is 565 kV/m everywhere, and the voltage of web 10 as measured with a fieldmeter at a 1 inch (about 25 mm) gap is 28.7 kV. For this situation, the field outside web 10 is very strong, and commercial neutralizers could be used to substantially net neutralize this web.

Figure 3:
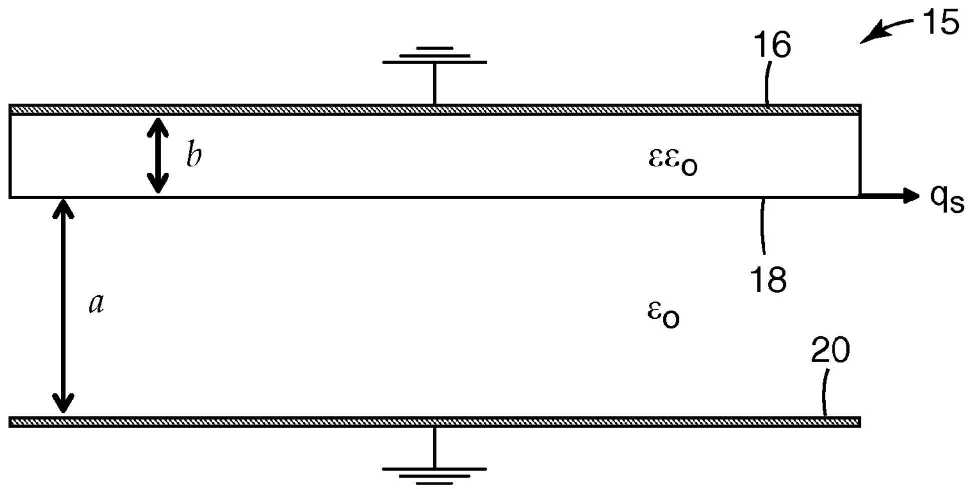
FIG. 3 is a schematic illustrate of a web with a grounded conductive backing on one side and a surface charge on the opposite side, with the opposite side in close proximity to a grounded conductive element.

Note that, for the same surface charge, the surface potential (voltage) of a 0.002 inch (about 0.051 mm) thick web with a conductive side (e.g., as in FIG. 1) is more than 3 orders of magnitude lower than for the case of a 0.002 inch (about 0.051 mm) web without a conductive side (e.g., as in FIG. 3). This is true even though both webs have substantial charge distributions.

Referring now to FIG. 3, an example is provided where a web with a grounded side is placed a distance a above a grounded element, such as a conductive plate. In use, the charge on the web is split between the two grounded elements. In FIG. 3, web 15 having a grounded first side 16, an opposite second side 18 and a distance b there between is illustrated. Second side 18 is distance a above a grounded element 20. The electric field in the gap beneath web 15 (i.e., between side 18 and plate 20) is given by:

$$E_g = -\left(\frac{b}{b + a\varepsilon}\right)\frac{q_s}{\varepsilon_o} \tag{3}$$

and the electric force per unit area on web 15 is given by:

$$T_w = -\left(\frac{b}{b + a\varepsilon}\right)^2 \frac{q_s^2}{2\varepsilon_o} \tag{4}$$

Equation 4 indicates that web 15 will be attracted to ground plate 20, and this "electric pressure" will increase as the gap decreases. As the gap a becomes large compared to web thickness b, the force of attraction will approach zero. As the gap a becomes small compared to web thickness b, the force per unit area will approach that of a web without a conductive backing, $$-\frac{q_s^2}{2\varepsilon_o}.$$

For the parameters given above in the discussion of FIGS. 1 and 2, this web 15 has a voltage of only 11.5 V. However, the limiting force of attraction to bottom plate 20 (also referred to as "pinning force") is 5.65 N/m$^2$. Furthermore, the voltage reading of web 15 will increase linearly with surface charge, but the force of attraction will increase quadratically. This is just one example of many situations where a nominally "neutral" web (as measured with a fieldmeter at a 1 inch (about 25.4 mm) gap) can have substantial charge. In some situations, the fields due to this charge can give rise can to problems in coating, drying, web handling and cleanliness. For example, these electric forces can lead to undesirable directionality of web 15 in ovens where the web is positioned in close proximity to grounded objects. It is also well known that fluid interfaces can be substantially disturbed by the action of electric fields, and these disturbances can lead to product defects in coated materials. See, for example, J. R. Melcher and G. I. Taylor, "Annual Review of Fluid Mechanics", 1969: 111-146; D. A. Saville, "Annual Review of Fluid Mechanics", January 1997, Vol. 29, 27-64; and "Coating & Drying Defects", Gutoff and Cohen, Wiley, NY, 1995.

Figure 4:
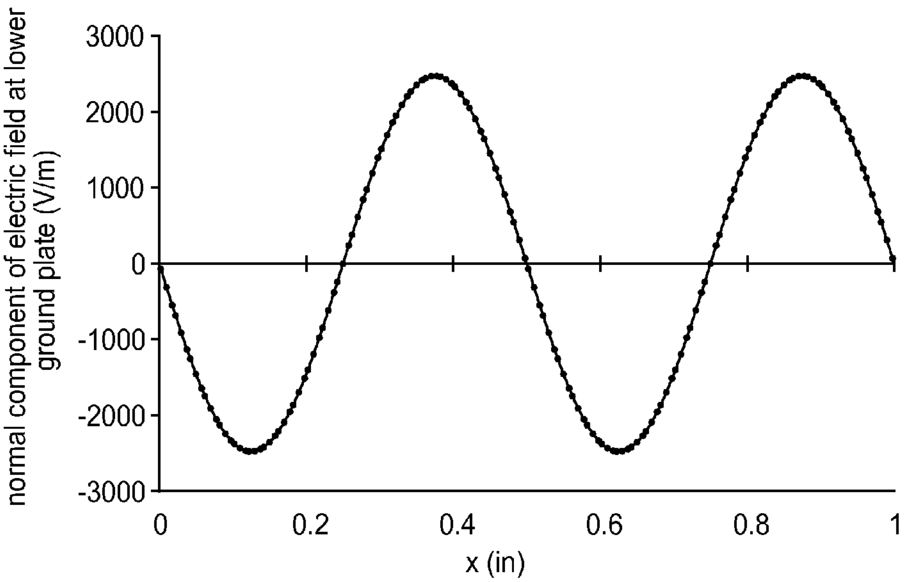
FIG. 4 is a graphical representation of the field at a bottom plate for a 0.05 mm/0.002 inch (about 0.0508 mm) web with a grounded surface and a sinusoidal charge distribution with mean zero, rms value of $10^5$ C/$m^2$ and a period of 1.3 cm/0.5 inches; the web to plate distance is about 0.5 cm/0.2 inches.

There exist many other forms of bipolar charge distributions that are not readily neutralized using commercial neutralizers or ionizers. Consider for example, an isolated web with a grounded backing on one side and a sinusoidal bipolar charge distribution with mean zero and rms value $q_s$, $$p(x) = q_s\sqrt{2}\sin\left(\frac{2\pi x}{X_s}\right) \tag{5}$$

on the other side. For web thickness on the order of $X_s$ or larger, the field below the isolated web dies off rapidly at a distance on the order of $X_s$. As web thickness is decreased below $X_s$, the field external to the web dies off more rapidly. For isolated webs with a thickness a couple of orders of magnitude smaller than $X_s$, the field is mainly confined within the web and the field external to the web is very weak. Now consider the situation where a grounded conductive plate is placed a distance g away from the dielectric side of the web. The normal component of the field at the bottom plate is shown in FIG. 4, for the case of a gap=0.05 in, web thickness=0.005 in and period $X_s$=0.5 in. Even at this large gap to web thickness ratio, the field in the gap is in the kV/m range. In FIG. 4 through FIG. 7, the rms value of the charge distribution was taken to be 10^5 C/m$^2$ and the electric permittivity of the web was taken to be five times that of the air in the gap. The electrical permittivity of air was taken to be that of a vacuum.

Figure 5:
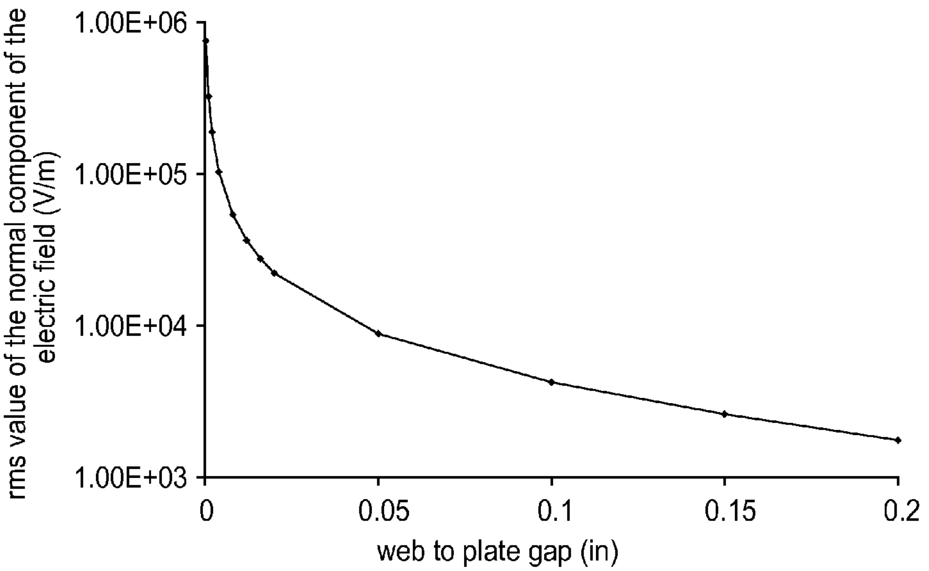
FIG. 5 is a graphical representation of the field at a bottom plate as a function of web to plate gap for a 0.05 mm/0.002 inch web with a grounded surface and a sinusoidal charge distribution with mean zero, rms value of $10^5$ C/$m^2$ and a period of 0.5 inches.

FIG. 5 shows the rms value of the normal component of the electric field at the grounded element as a function of gap distance for the case of web thickness=0.005 in and period $X_s$=0.5 in. From FIG. 5, it is seen that quite large fields can be achieved for gaps more than an order of magnitude larger than the web thickness. The rms values in FIG. 4 can be converted to peak values by multiplying by $\sqrt{2}$.

Figure 6:
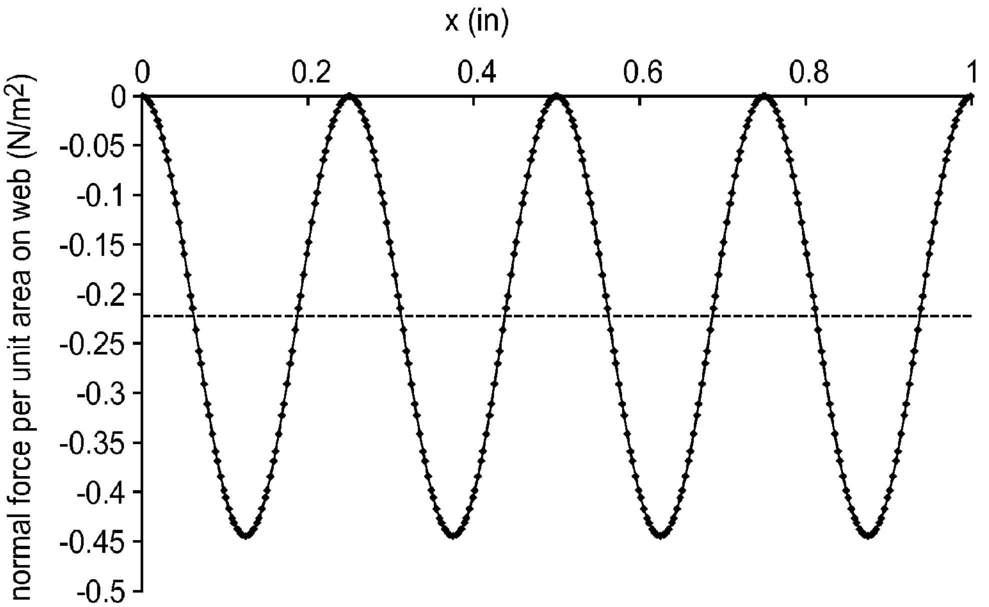
FIG. 6 is a graphical representation of the normal force on a 0.05 mm/0.002 inch web with a grounded surface and a sinusoidal charge distribution with mean zero, rms value of $10^5$ C/$m^2$ and a period of 1.3 cm/0.5 inches; the web to plate distance is 0.001 inches.
Figure 7:
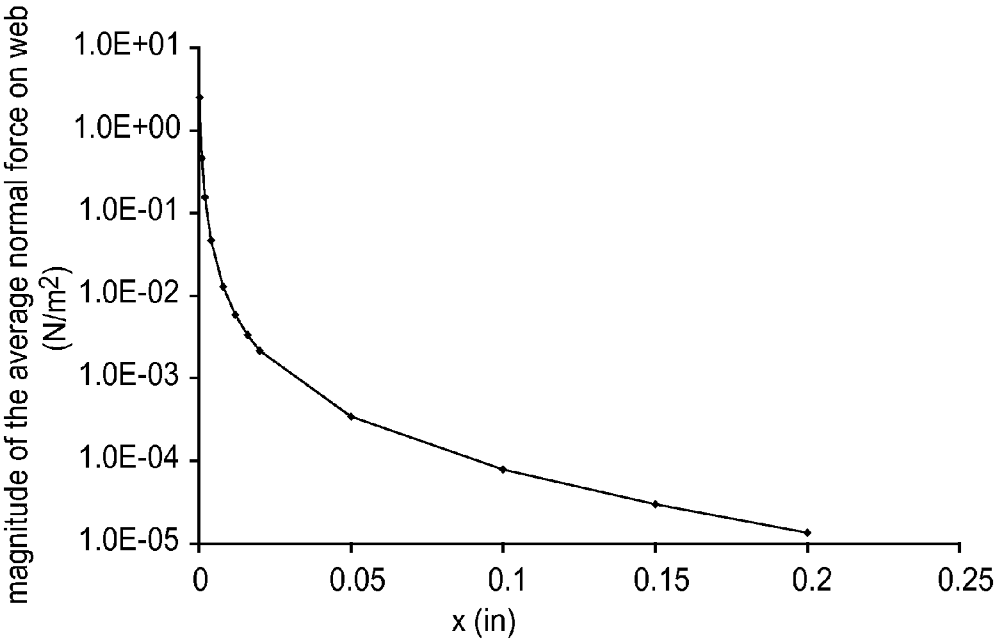
FIG. 7 is a graphical representation of the normal force of the field as a function of web to plate gap for a 0.05 mm/0.002 inches web with a grounded surface and a sinusoidal charge distribution with mean zero, rms value of $10^5$ C/$m^2$ and a period of 1.3 cm/0.5 inches.

Similar to the case of a constant surface charge discussed in respect to FIG. 1, these sinusoidal charge distributions can also lead to undesirable effects in coating, web handling, drying and cleanliness. For example, FIG. 6 shows the normal force per unit area (normal component of the electric stress tensor) profile on the web for a gap one order of magnitude smaller than the web thickness and four orders magnitude smaller than the period of the charge distribution. FIG. 7 shows the magnitude of the average normal component of the electric stress on the web as a function of gap for the case of web thickness=0.005 in and period $X_s$=0.5 in.

In order to keep the calculations simple, the theoretical examples discussed above are for a web with a grounded backing on one side and a surface charge distribution on the other side. In practice, the bipolar charge distributions may be present on one or both surface of, or internal to, a dielectric material.

In accordance with this disclosure, charge modification of the web can be accomplished by contacting both sides of the web with a liquid solvent, usually simultaneously, and then removing and/or drying the solvent.

The liquid might be applied to the web by any suitable means including immersion (e.g., dipping into a pool or bath), coating (e.g., die coating, knife coating) or spraying, applying saturated wicks or cloths to both sides of the web, absorption/adsorption or condensation of vapor onto the web surface, etc. It is preferred that the entire surface, preferably both surfaces, are completely and continuously covered by the liquid.

After application, the liquid is then removed and/or dried, employing evaporatative and/or non-evaporative means. Non-evaporative methods includes the use of a physical device such as a wick, air knife, squeegee, etc. to remove at least some of the solvent. Additionally or alternately, at least some of the solvent could be evaporatively removed from the web, and the evaporation may be enhanced by methods such as air convection, heating, etc. The preferred resulting web is both net neutralized and dual-side neutralized, as defined above.

In some embodiments, the liquid is only partially removed, such as by removing one or more constituents of the liquid while leaving one or more constituents on the web. For example, in some embodiments the liquid includes a solvent and an acrylate. If desired, the solvent can be removed while the acrylate stays behind and retains the charges on the surface of the dielectric material. Electron beam radiation can be used to solidify the acrylate before or after the removal of the liquid solvent. In another embodiment, the liquid is a mixture of two or more miscible liquids. A first of the liquids has a relatively higher vapor pressure, while a second of the liquids has a relatively lower vapor pressure. The first liquid is removed by evaporation, leaving behind the second liquid. The second liquid is then cured to a solid if desired. An example of the first liquid is toluene and an example of the second liquid is transformer oil.

In some embodiments, the liquids suitable for modifying web charge in accordance with this disclosure are generally either organic solvents or alcohols that have a conductivity of at least about $1\times10^5$ pS/m) and no more than about $1\times10^9$pS/m. The conductivity of a material indicates how well charge flows through the material. Generally, although water (i.e., distilled water, tap water, salt water, etc.) has a conductivity level within or close to the desired range, water was found not to be a preferred primary solvent for these apparatus and methods.

The solvents suitable for modifying web charge in accordance with this disclosure usually have a dielectric constant of at least about 10 and no more than about 40. In some embodiments, the suitable solvents have a dielectric constant of about 15 to about 35. The dielectric constant relates to the ability of a substance (e.g., liquid) to polarize in response to an electric field and thereby attenuate the electric field in the material. The dielectric constant relates to the capacitance of the material (i.e., how well the material stores charge). Air has a dielectric constant slightly about 1. It has been found by the investigators, however, that too high of a dielectric constant (possibly in conjunction with other properties of the liquid) tended to lessen the ability of the liquid to effectively neutralize the web. That is, too high of a dielectric constant is not desirable for the apparatus and methods of this disclosure.

Examples of suitable solvents for neutralization include: isopropyl alcohol or isopropanol, methanol, ethanol, methyl ethyl ketone (MEK) and acetone. We note again that the word solvent is used herein to refer to a liquid which wets the web, and does not necessarily imply the solvation of any particular chemical species. The solvents are liquids commonly known as “solvents”. A mixture of two or more solvents could also be used.

Figure 8:
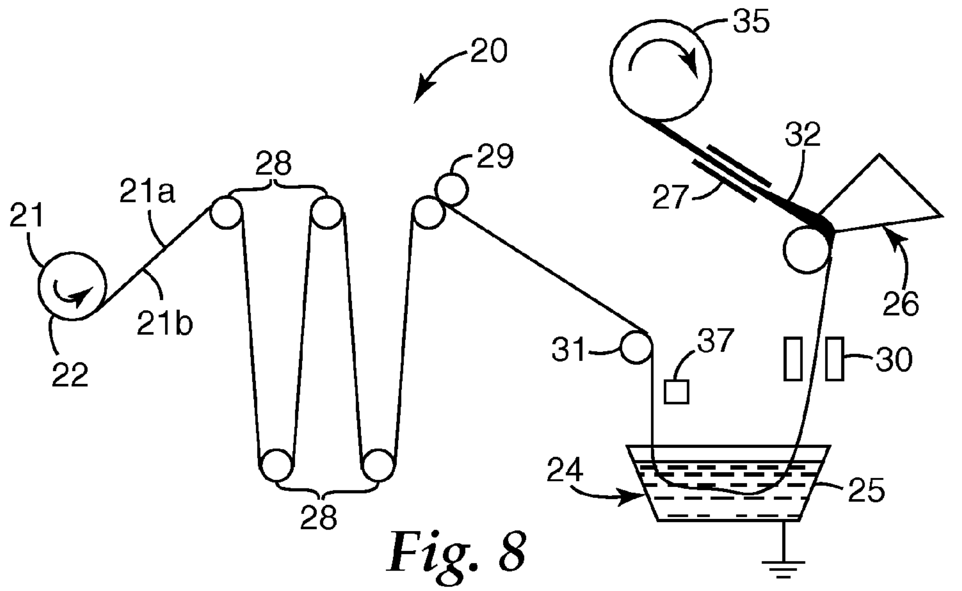
FIG. 8 is a schematic diagram of a web handling apparatus that includes a charge modification system according to this disclosure.

FIG. 8 is a schematic diagram of a web handling apparatus that includes a charge modification system according to this disclosure. FIG. 8 illustrates a web handling process 20 that has a web source 22 for web 21 (having a first side 21*a* and a second side 21*b*), a charge modification station 24, and a coating station 26. The web follows a path from web source 22, to charge modification station 24, to coating station 26 that has various rollers 28, nips 29, tenders, and other well known web handling equipment.

Web source 22 may be an elongate length of web 21 wound as a roll, which could have a core or be coreless. Alternately, web source 22 could be an extrusion process, forming web 21 immediately prior to web handling process 20. In most embodiments and as illustrated in FIG. 8, however, web source 22 is a roll of web material. As web 21 is unrolled from web source 22, both sides 21*a*, 21*b* pick up charge; such phenomenon is well known.

In this embodiment, web 21 from web source 22 is fed through a series of rolls 28, which are well known. At each roll 28, web 21 picks up charge, due to the contact and release from each of the rolls 28. Typically, the side of web 21 that contacts roll 28 picks up the charge.

From rolls 28, web 21 moves to a drive nip 29 and then to an idler roll 31. From idler roll 31, web 21 progresses to charge modification station 24.

The coating web enters the charge modification station 24 with electrical charging due to multiple causes in its previous history. These can include charging caused by the manufacturing of web 21, handling to obtain web source 22, winding the web into a wound roll and handling of that roll, unwinding from the wound roll, contact and separation from various web handling components, charging from other web static neutralization or charging devices, etc.

The various tensioner rolls 28, drive nip 29 and idler roll 31 in web handling process 20, as well as other rolls that might be present, are conventional, well known web handling equipment. It is generally well known to limit the number of contact points (i.e., rollers, nips, bars, etc.) with web 21 during processing, in order to inhibit continued accumulation of charge.

In accordance with the present disclosure, web handling process 20 includes charge modification station 24, which removes the accumulated charges from web 21 and provides a dual-side or bipolar neutralized web or at least an essentially dual-side or bipolar neutralized web. In many and in preferred embodiments, both sides 21*a* and 21*b* are dual-side or bipolar neutralized upon emerging from charge modification station 24.

In the illustrated embodiment of FIG. 8, charge modification station 24 includes a container 25 for receipt and holding of solvent. Container 25 is sufficiently large (wide) and deep to allow the entire width of web 21 to be immersed in the conductive solvent held within container 25. In preferred embodiments, both sides 21*a*, 21*b* are totally immersed in the conductive solvent.

Container 25 is grounded.

Charge modification station 24 preferably provides a symmetric exposure of web 21 (i.e., both sides 21*a*, 21*b*) to container 25. The residence time of web 21 within the solvent may be any period sufficient to provide a continuous coating of the solvent on sides 21*a*, 21*b*, with preferably no surface areas unwetted by the solvent.

Downstream of container 25 is a drying apparatus 30 that removes the liquid components of the solvent from web 21. Drying apparatus 30 may employ non-evaporative methods to remove solvent from both sides of the web, such as wicks, squeegees, dams, knives, and air streams (e.g., air knives). Additionally or alternately, drying apparatus 30 may include a passive device that facilitates evaporation of the solvent from web 21. Examples of such devices include convection ovens, blowers, radiation (e.g., IR lamps), etc. Drying apparatus 30 preferably provides a symmetric drying of sides 21*a* and 21*b* of web 21.

Optionally, one or more conventional neutralization systems 37 might be provided in the web path prior to the charge modification station 24 to provide an essentially net neutral web to the charge modification station 24. Examples of commercially available neutralization systems 37 include air ionizers, electrical static eliminators such as systems from MKS Ion Systems and Simco (an Illinois Tool Works company), induction static eliminators (e.g., static string, tinsel, needle bars, and brushes) and nuclear static eliminators, etc.

By mechanisms of which have not been fully determined by the investigators, the resulting dried web 21 is dual-side or bipolar neutral or at least essentially dual-side or bipolar neutral. Both sides 21*a*, 21*b* are dual-side or bipolar neutral or at least essentially dual-side or bipolar neutral, if both sides were fully wetted with and dried of solvent.

As provided above, the at least weakly conductive solvent has a dielectric constant of about 10 to about 40. It has been found by the investigators that, despite meeting the criteria of being at least weakly conductive, de-ionized water, salt water, and surfactant/water solutions do not provide preferred neutralizing results, possibly due to the high dielectric constants of those solutions.

Returning to FIG. 8, web 21, now dual-side or bipolar neutral or essentially dual-side or bipolar neutral, progresses to coating station 26 where a coating 32 is applied to side 21*b*. Coating 32 may be any coating, such as a coating for optical displays, graphics, protective layers, imaging layers, photographic layers, an electronic layer, an adhesive, an abrasive, etc.

From coating station 26, web 21 progresses to a dryer 27 to dry coating 32, e.g., remove any solvents from coating 32. In this example, dryer 27 is a gap dryer.

It is well known, in prior processes that provide a coating on a web that is not essentially dual-side or bipolar neutral, that drying patterns (e.g., swirls, whorls, fish eyes, etc.) frequently occur. It is believed that having an electrostatic charge on either the coated side (side 21*b*) or the side opposite the coated side (side 21*a*) facilitates the drying pattern. By neutralizing the web, in accordance with the present disclosure, drying patterns are inhibited.

Charge modification station 24, and variations thereof, are particularly suited for various applications that benefit from dual-side or bipolar neutral web. Various examples have been provided above. Charge modification station 24, and variations thereof, are also suited for applications that can utilize a charged web. For example, such a web may be used in a dual side meniscus coating process (where both dies are grounded). In such a process, the charge modification system may be present in the free span prior to the coating roll, allowing time for the solvent to dry prior to the coating roll. In such a case the web should enter the coating station with a zero top-side and bottom-side charge, and only the tribocharging of the web coming off the coating roll should be an issue. It is possible that residual solvation the back-side could mediate somewhat this tribocharging effect.

Additionally, web handling process 20 is designed to minimize the contact of elements such as idlers and other rolls to web 21 during the processing and at any point in the web path prior to critical steps such as applying a coating (e.g., at coating station 26) or drying or curing of the applied coating (e.g., at dryer 27).

Examples, FIGS. 9-27

The following non-limiting examples illustrate various embodiments of this disclosure.

For the following examples, a rolled web of Scotchpak™ film (1.4 mil polyester, Type 860140, commercially available from 3M Company) was used as the film supply. As is well known, upon unrolling of the web, both sides of the film web had a charge associated therewith. The static neutralization apparatus of FIG. 9, described below, was used to neutralize the charge on the web. The film supply is illustrated at reference number 40 in FIG. 9. The film was unwound from film supply 40 exposing first side 40*a* and second side 40*b*.

A breadboard idler module was used to create a web path including a conventional nuclear bar 42 for neutralizing net charge on web 40, a neutralization assembly 50 according to the present disclosure, air knives 52, drying apparatus 54 (in this set up, IR lamps), and static charge measurement sensors 56 and 57. The air knives were fed with clean house nitrogen both as a safety precaution and to prevent contamination of the system from typical house compressed air (oil, etc.).

Nuclear bar 42 was a NUCLEOSTAT model P-2001 static eliminator, used to create a fairly net neutral web representative of that obtained from conventional web neutralization systems. In some tests, nuclear bar 42 was replaced with a static string 43, as identified below.

Neutralization assembly 50 consisted of an aluminum casserole pan 55 and an idler roll assembly 51. Idler assembly 51 caused web 40 to travel horizontally through the pool of solvent (both sides wet) for approximately 10 inches (about 0.254 meters). Web 40 exited the solvent pool vertically and was transported via two other idlers 53 to the $N_2$ fed air knives 52 (from Exair Corporation). The feed pressure to the air knives was approximately 80 PSI nitrogen. Web 40 traveled vertically between a pair of 500 watt IR lamps 54 (from Cooper Lighting, model WO500).

The web voltages were measured as follows:

Net web voltage was measured in a free span created after the IR lamps using a 3M Model 718 static meter 57.

The top side (side 40*b*) web voltage was measured over a grounded idler 58 using a Monroe Electronics Isoprobe electrostatic voltmeter model 279 with a Model 1034EL probe. In some tests, the top side voltage reading was orders of magnitude less than the net voltage reading. This was because of the following theory: For example, if a web has a charge q on one side and zero charge on the other, the net voltage reading by the 718 static meter would be $qa/\in\in_o$, where a=1 in. If the uncharged side of the web were placed against a grounded idler, the top-side voltage reading using the Monroe voltmeter would be $qd/\in$, where d is the web thickness. The ratio of the top-side voltage to the net voltage is therefore $\propto d/a$. For a 1 mil web with charge q on the top side, the top-side voltage reading will be 1000 times less than the net voltage reading.

Net and top side voltage data were collected on a Tektronix TDS 3034B oscilloscope. The scope was set to collect 500 data points over a 20 second time interval.

Figure 10:
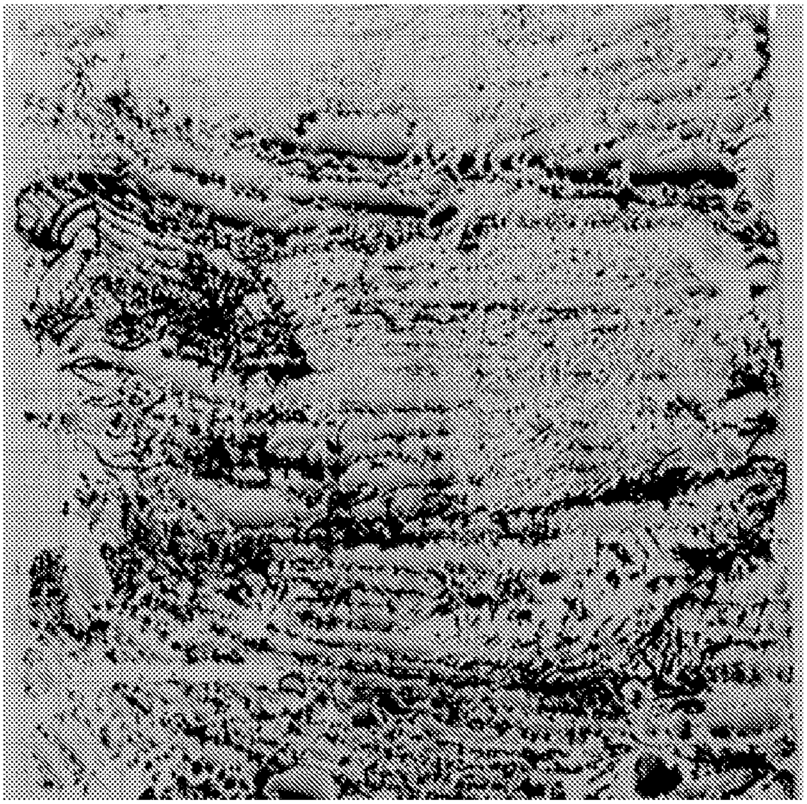
FIG. 10 is a photomicrograph of a powder coated web from the Examples having no neutralization done thereon.
Figure 11:
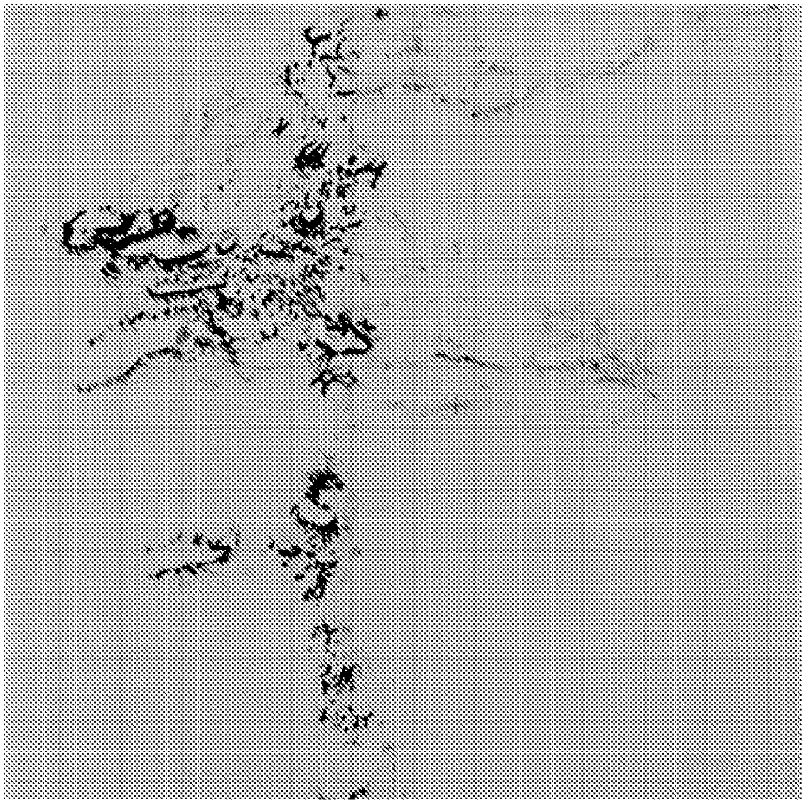
FIG. 11 is a photomicrograph of a powder coated web from the Examples having been passed under a conventional nuclear bar and a conventional quartz lamp.
Figure 12:
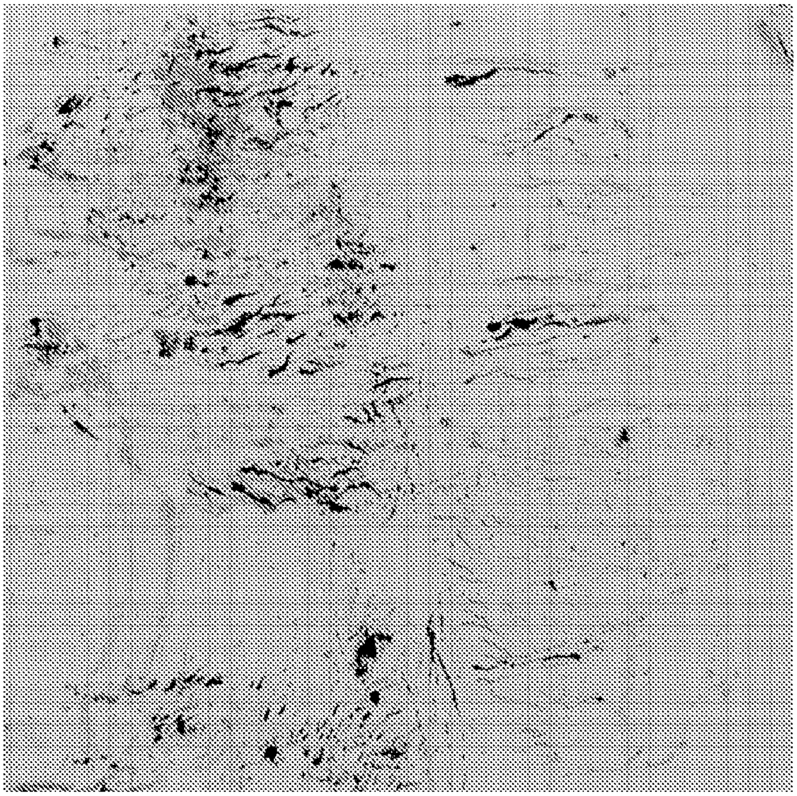
FIG. 12 is a photomicrograph of a powder coated web from the Examples having been passed under a static string, nitrogen air knives, and IR lamps.
Figure 13:
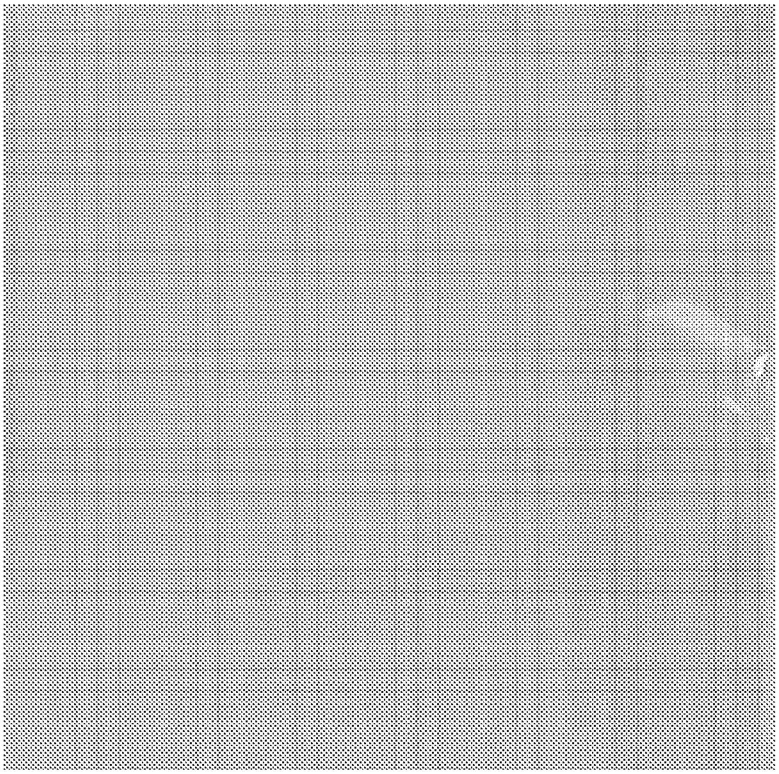
FIG. 13 is a photomicrograph of a powder coated web from the Examples having been neutralized with isopropyl alcohol, in accordance with the present disclosure.

After drying, some samples were coated with bipolar static powders to visualize whether or not any charge, and if so, what pattern, was present on the sample. The method used is described in Harry H. Hull, "A method for studying the distribution and sign of static charges on solid materials", Journal of Applied Physics, volume 20, December 1949, p. 1157-1159. FIGS. 10-13 show the visible results when powder coating charged versus neutral webs. FIG. 10 is a photomicrograph of a powder coated web from the Examples having no neutralization done thereon. FIG. 11 is a photomicrograph of a powder coated web from the Examples having been passed under a conventional nuclear bar and a conventional quartz lamp. FIG. 12 is a photomicrograph of a powder coated web from the Examples having been passed under a static string, nitrogen air knives, and IR lamps. FIG. 13 is a photomicrograph of a powder coated web from the Examples having been neutralized with isopropyl alcohol, in accordance with the present disclosure.

The following solvents were utilized for testing:

Methanol, HPLC Grade

Ethanol, Pharmco Brand, 200 Proof

Isopropanol, from the bulk lab supply

Methyl ethyl ketone, from bulk lab supply

Acetone, from the bulk lab supply

Heptane, from the bulk lab supply

Toluene, from the bulk lab supply

DI Water, from de-ionized water supply for laboratory bldg

Tap Water, from suburban water treatment center (city of Woodbury, Minn.)

Table Salt, Morton table salt, from lunchroom supply

3M Fluorad FC-171, 0.01% wt, expected to be 22 dyne/cm surface tension

Figure 9:
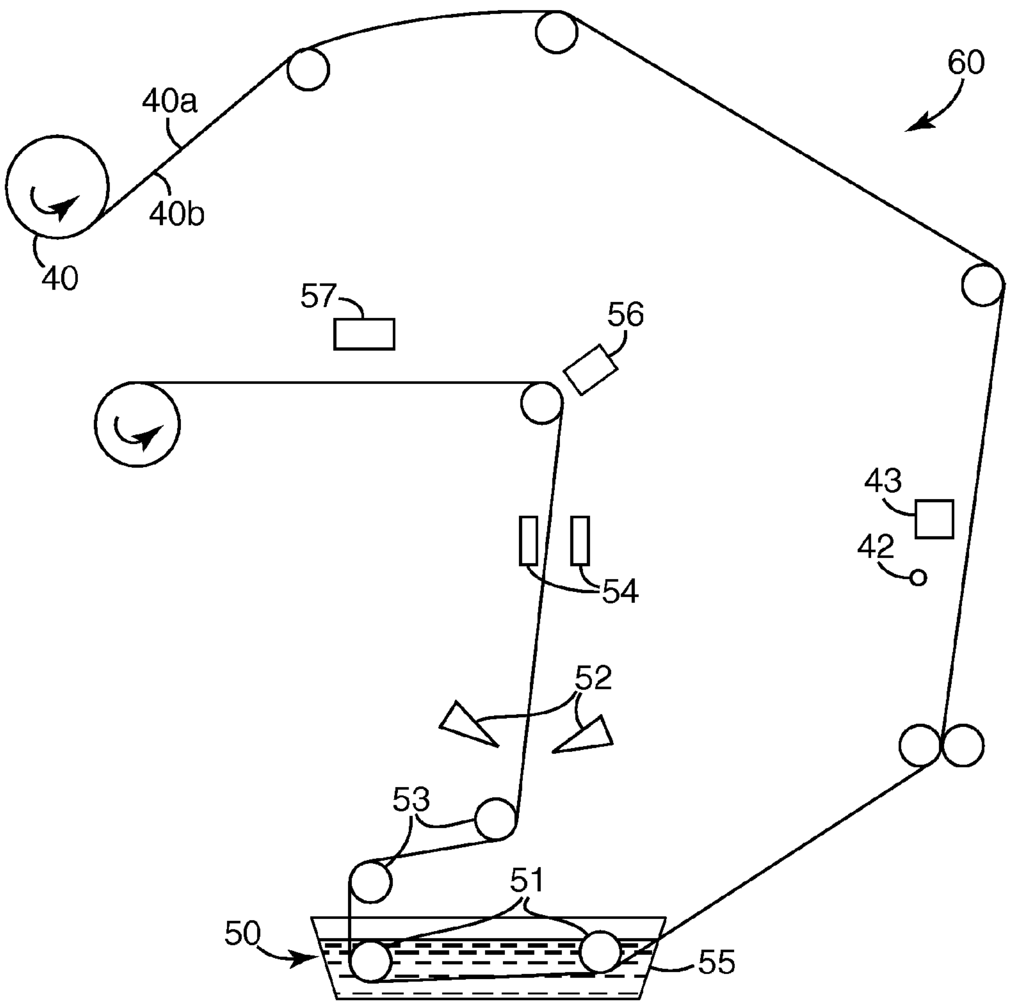
FIG. 9 is a schematic diagram of the web handling apparatus used for the Examples described in this disclosure.

The apparatus of FIG. 9 was operated with each of methanol, ethanol, isopropanol (IPA), methyl ethyl ketone (MEK), acetone, heptane, toluene, DI water, tap water, saline water, and Fluorad FC-171 being used as the solvent present in neutralization assembly 50.

The solvents that worked best with minimal intervention were methanol, ethanol, MEK and IPA.

From the solvents tested (whether or not they were one of methanol, ethanol, MEK or IPA), various details regarding preferred methods for neutralizing the web were discovered.

For example, although acetone was not initially one of the preferred solvents, those tests demonstrated the importance of providing even (side-to-side) dewetting and drying of the solvent across the web. It was found that adjusting the air knife on that side to result in even/symmetric drying of both sides of the web to compensate for the not preferred non-symmetric web path with idlers 53 after the solvent immersion, the static neutralization became effective both for net neutralization and dual-side or bipolar neutralization. With proper adjustment, good dual-side or bipolar neutralization was attained even beyond 20 m/min web speed.

FIGS. 14-27 are graphical representations of the charge present on a web in various Examples. For all tests, unless indicated otherwise, the webspeed was 4 m/minute. Each of the probes were mounted at a fixed crossweb location, so the data collected represents the voltage of a particular crossweb location. The time axis in these figures can be converted to distance by multiplying by line speed.

Figure 14:
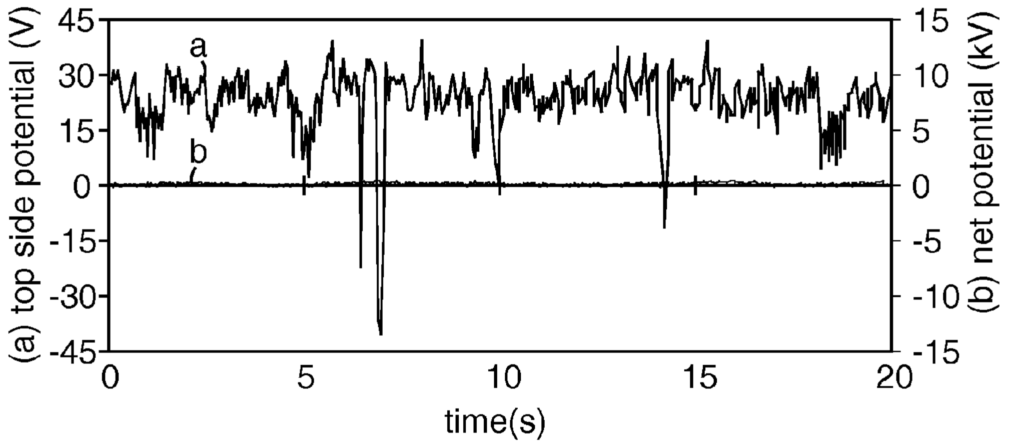
FIG. 14 is a graphical representation of the charge on a web from the Examples having no neutralization done thereon.
Figure 15:
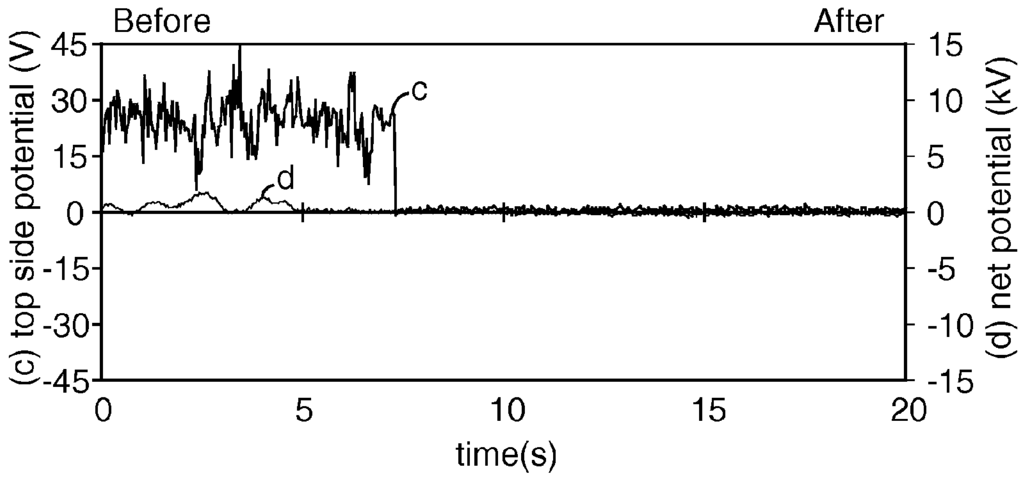
FIG. 15 is a graphical representation of the charge on a web from the Examples having been passed under a static string and nitrogen air knives and then wetted with isopropyl alcohol.
Figure 16:
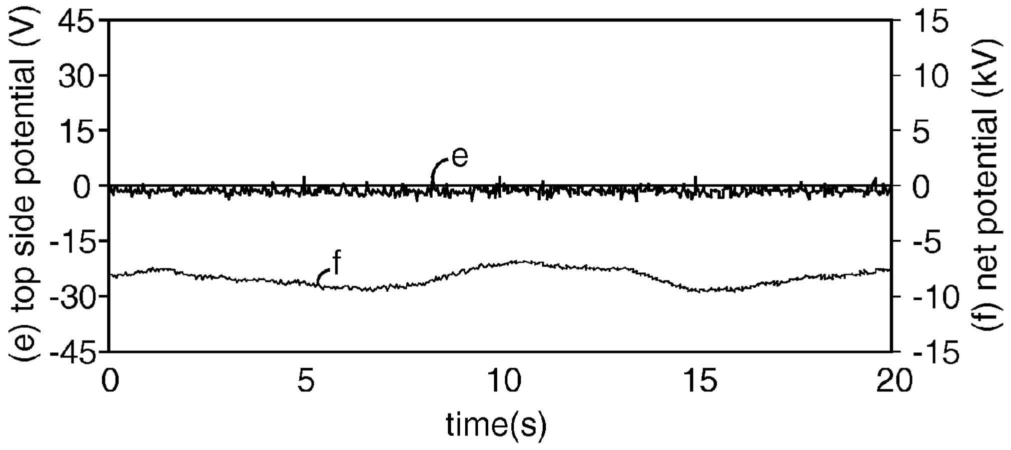
FIG. 16 is a graphical representation of the charge on a web from the Examples having been passed under a nuclear bar, with nitrogen air knives and IR heaters on, and immersed in acetone.
Figure 17:
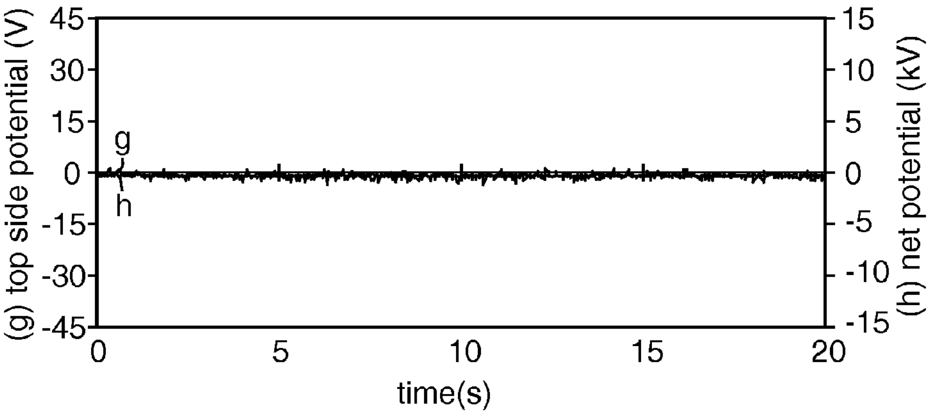
FIG. 17 is a graphical representation of the charge on a web from the Examples having been passed under a nuclear bar, with nitrogen air knives and IR heaters on, and immersed in acetone.

FIG. 14 shows the charge present on the web after having been passed under a conventional nuclear bar. This might be referred to as an example of the base case, similar to what is achievable using commercial neutralizers. The actual charge variations on the web will change roll-to-roll and within a single roll, depending on the particular history of the material from birth to measurement. FIG. 14 is meant to give an idea of the charge variation that exists after commercially-available neutralization methods are employed on this particular commercially-available untreated web. FIG. 15 shows the charge present on the web before and after the web was immersed in isopropyl alcohol, in accordance with the present disclosure. FIG. 16 shows the charge present on the web after the web was immersed in acetone, in accordance with the present disclosure. The net charge induced was due to uneven wetting of the two opposite sides of the web. FIG. 17 shows the charge present on the web after the web was uniformly immersed in acetone and symmetrically dried, in accordance with the present disclosure. This illustrates the importance of symmetric wetting and drying of the solvent during the process.

Figure 18:
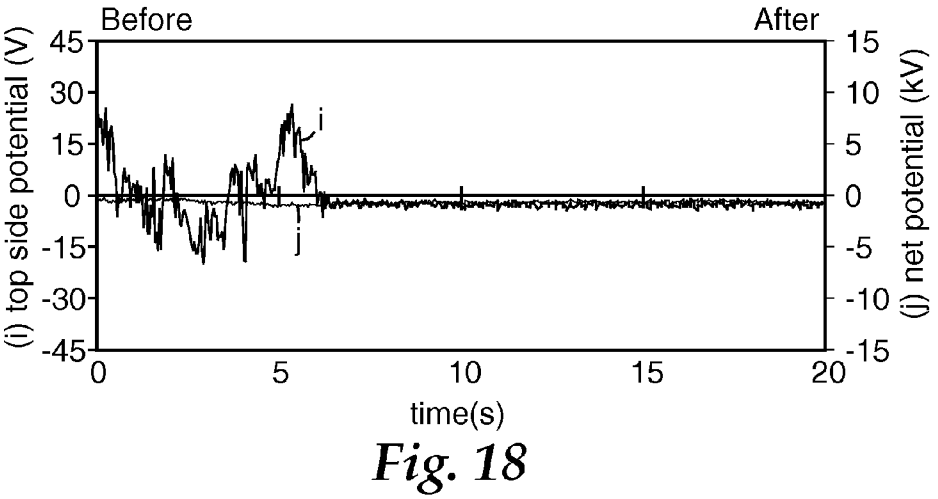
FIG. 18 is a graphical representation of the charge on a web from the Examples having been passed under a nuclear bar and wiped with acetone.
Figure 19:
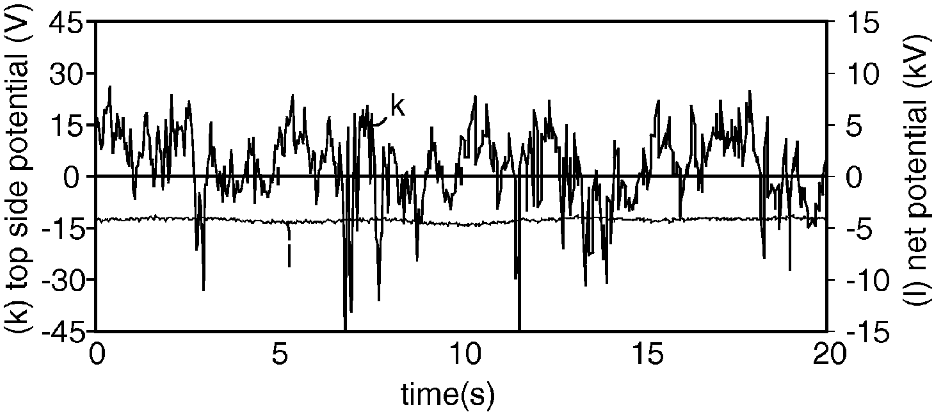
FIG. 19 is a graphical representation of the charge on a web from the Examples having been passed under a nuclear bar, with nitrogen air knives and IR heaters on, and immersed in heptane.
Figure 20:
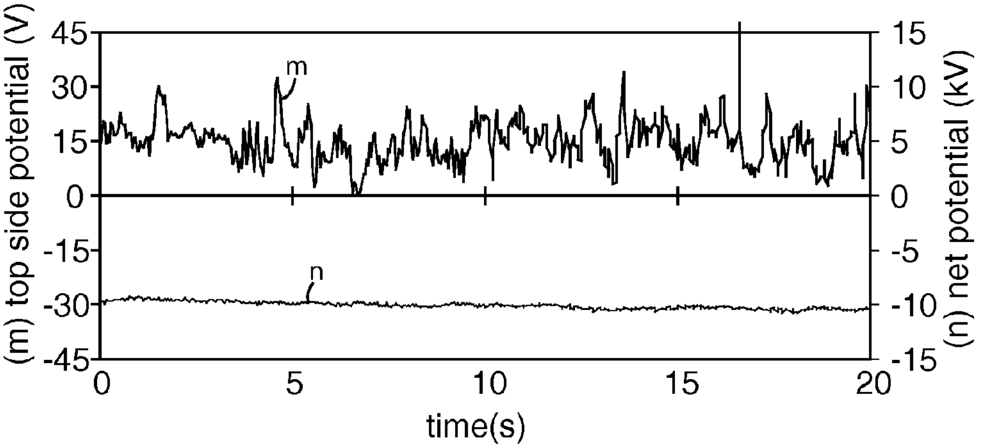
FIG. 20 is a graphical representation of the charge on a web from the Examples having been passed under a nuclear bar, with nitrogen air knives and IR heaters on, and immersed in tap water.
Figure 21:
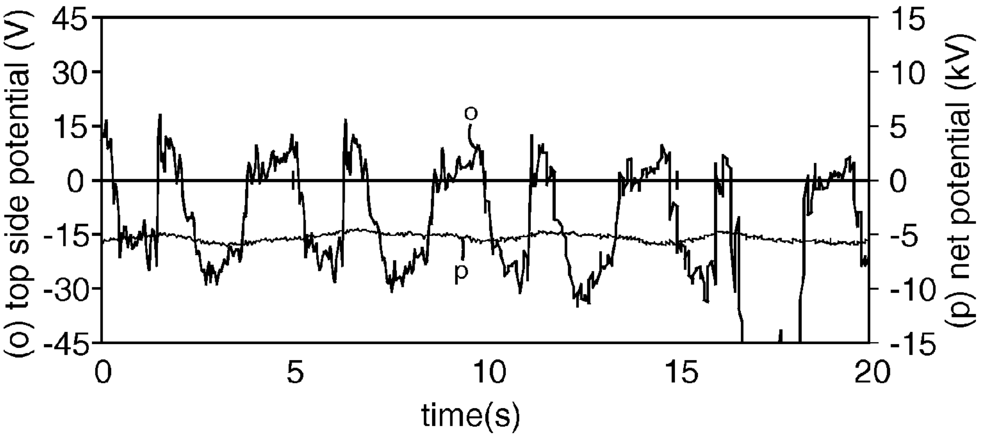
FIG. 21 is a graphical representation of the charge on a web from the Examples having been passed under a nuclear bar, with nitrogen air knives and IR heaters on, and immersed in toluene.

FIG. 18 shows that the wicks or cloths can be utilized for some methods according to the present disclosure. In this example, acetone was again utilized as the solvent, in accordance with the present disclosure. Instead of an immersion pan as the previous example, a wiping cloth (such as a "Wypall") dampened with acetone and grounded was held simultaneously on both sides of the moving web. FIG. 18 shows before and after wiping, with excellent neutralization of the net and top side charge upon application of the acetone.

As mentioned above, however, not all solvents were effective for the run experiments. For the same webspeed and immersion time as used for IPA and Acetone, heptane (FIG. 19), tap water (FIG. 20) and toluene (FIG. 21) not only did not neutralize the top side of the web, but also created a non-zero net charge on the film (see FIG. 14 for the base case of only conventional neutralization).

Figure 22:
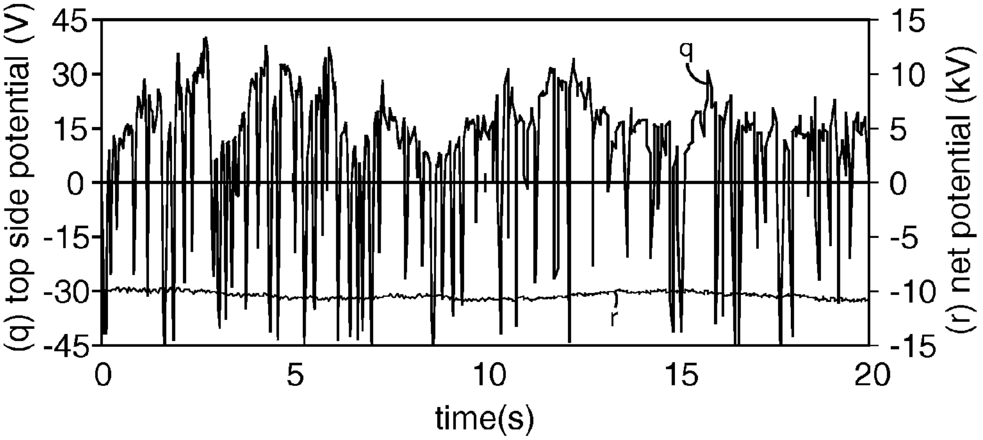
FIG. 22 is a graphical representation of the charge on a web from the Examples having been passed under a nuclear bar, with nitrogen air knives and IR heaters on, and immersed in DI water.
Figure 23:
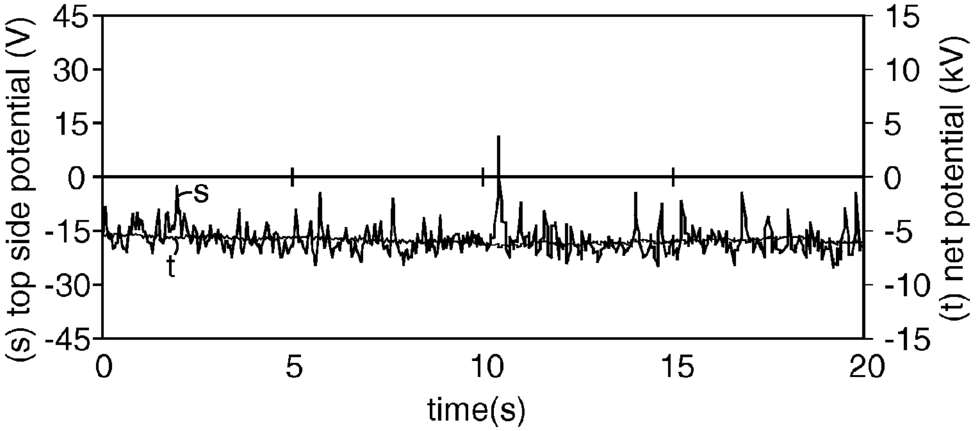
FIG. 23 is a graphical representation of the charge on a web from the Examples having been passed under a nuclear bar, with nitrogen air knives and IR heaters on, and immersed in DI water and two splashes of isopropyl alcohol.
Figure 24:
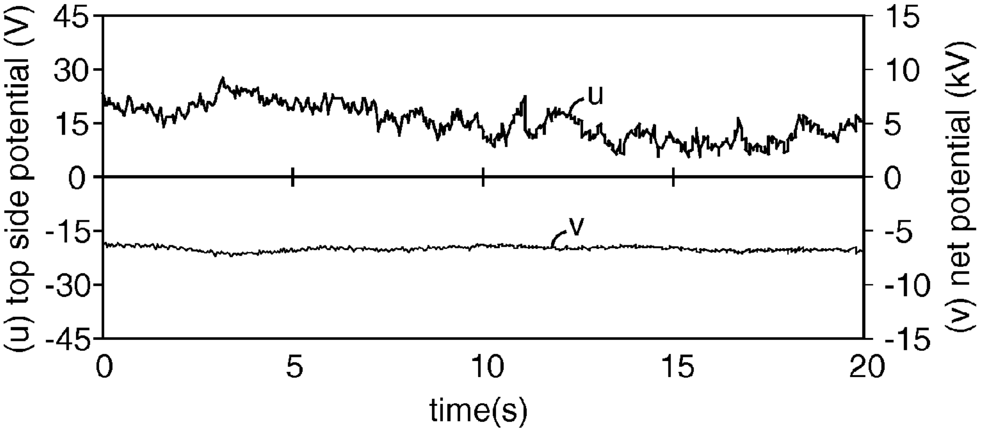
FIG. 24 is a graphical representation of the charge on a web from the Examples having been passed under a nuclear bar, with nitrogen air knives and IR heaters on, and immersed in saline (tap water with added table salt).

FIG. 22 shows the results of DI water on neutralization. In an attempt to improve the neutralization of water and DI water, splashes of IPA were added; the results are illustrated in FIG. 23, which shows the results when two splashes of isopropyl alocohol were added to DI water. As the IPA content increased, the system migrated closer to the good performance of the all IPA system (see FIG. 14).

In another series of tests, the effect of conductivity of the water was investigated. DI water (least conductive) was compared to tap water (some ionic contamination) and to saline water (table salt added to tap water). See FIG. 22 as compared to FIG. 24. It was found that apparently, bringing the water to a high level of ionic conductivity itself does not enable its effectiveness for web neutralization.

Figure 25:
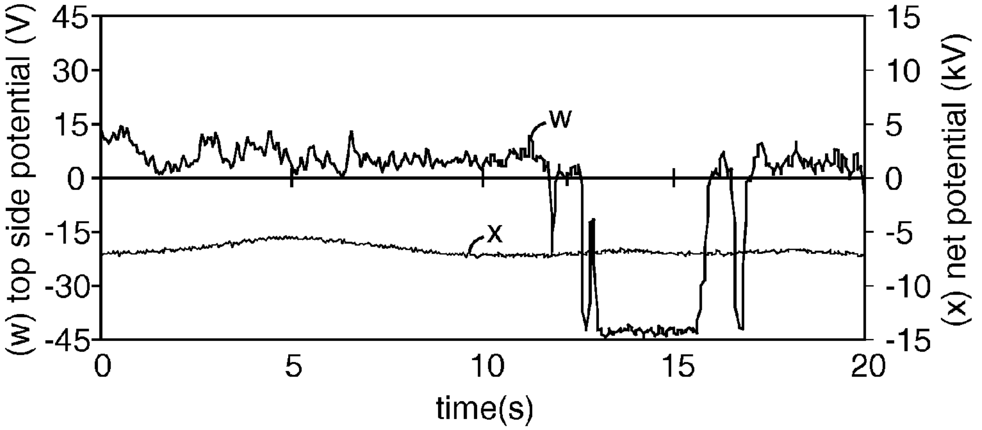
FIG. 25 is a graphical representation of the charge on a web from the Examples having been passed under a nuclear bar, with nitrogen air knives and IR heaters on, and immersed in DI water with fluorocarbon additive.
Figure 26:
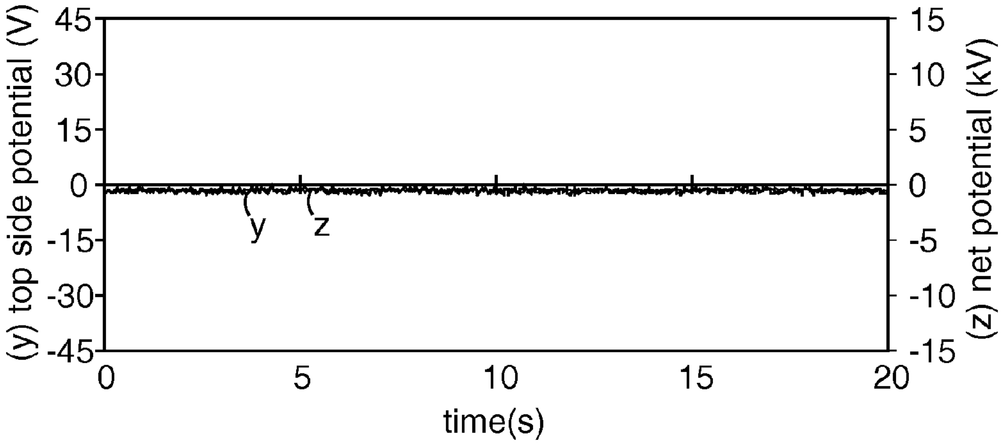
FIG. 26 is a graphical representation of the charge on a web from the Examples having been passed under a nuclear bar, with nitrogen air knives and IR heaters on, and immersed in ethanol.

In yet another series of tests, the effect of surface tension on the static neutralization was investigated. DI water (up to 72 dyne/cm surface tension) (FIG. 22) was compared to DI water with FC-171 fluorosurfactant at 0.01% (about 21 dyne/cm surface tension) (FIG. 25). Again, the surfactant was not effective in enabling water to neutralize the web.

The properties of various solvents are provided below:

| Liquid | Webline Static Neutralization | Conductivity (pS/m) | Dielectric Constant or Relative Permittivity | Relaxation Time (sec) | Dipole Moment (Coul/m) | Surface Tension (dyne/cm) | Vapor Pressure @ 25 C. (kPa) | Latent Heat of Vaporization (J/kg) | Boiling Point (C.) | Solubility Parameter (J/cm^3)^0.5 |
|---|---|---|---|---|---|---|---|---|---|---|
| Methanol | Good | 4.40E+07 | 32.7 | 6.60E−06 | 5.67E−30 | 22.22 | 1.68E+01 | 1.17E+06 | 64.70 | 29.44 |
| Ethanol | Good | 1.35E+05 | 24.55 | 1.60E−03 | 5.64E−30 | 22.09 | 7.92E+00 | 9.23E+05 | 78.30 | 26.14 |
| Isopropanol | Good | 3.50E+08 | 19.92 | 5.00E−07 | 5.54E−30 | 21.01 | 6.05E+00 | 7.42E+05 | 82.26 | 23.42 |
| Acetone | Good | 6.00E+06 | 20.7 | 3.00E−05 | 9.60E−30 | 23.04 | 3.08E+01 | 5.38E+05 | 56.29 | 19.73 |
| Methyl Ethyl Ketone | Sensitive Good | 1.00E+07 | 18.51 | 1.60E−05 | 9.21E−30 | 23.96 | 1.23E+01 | 4.80E+05 | 79.63 | 18.88 |
| Water (Extremely Pure) | Bad | 4.30E+06 | 80.4 | 1.70E−04 | 6.17E−30 | 72.82 | 3.17E+00 | 2.44E+07 | 100.00 | 47.81 |
| Water (Air Distilled) | Bad | 1.00E+09 | 80.4 | 7.10E−04 | 6.17E−30 | 72.82 | 3.17E+00 | 2.44E+07 | 100.00 | — |
| Tap Water | Bad | — | — | — | 6.17E−30 | — | 3.17E+00 | 2.44E+07 | 100.00 | — |
| Saline Water | Bad | — | — | — | 6.17E−30 | — | 3.17E+00 | 2.44E+07 | 100.00 | — |
| Water + FC-171 | Bad | — | — | — | 6.17E−30 | 21 | 3.17E+00 | 2.44E+07 | 100.00 | — |
| Toluene | Bad | 1.00E+00 | 2.38 | 2.10E+01 | 1.20E−30 | 27.92 | 3.80E+00 | 4.12E+05 | 110.63 | 18.25 |
| Heptane | Bad | 3.00E−02 | 2 | 1.00E+02 | 0.00E+00 | 19.82 | 6.07E+00 | 3.66E+05 | 98.43 | 15.20 |
| 3M Novec HFE-7100 | NA | 2.00E+04 | 5.1 | 2.26E−03 | — | — | 26.847 | — | 60.00 | — |
| 3M Novec HFE-7200 | NA | 2.00E+04 | 8.8 | 3.90E−03 | — | — | 15.7 | — | 73.00 | — |
| 3M Novec HFE 7500 | NA | 6.70E+03 | 7.7 | 1.16E−02 | — | — | — | — | — | — |

The process time in the examples given above was approximately the web path distance from the point where the web was wet by the solvent to the point where the solvent was completely dried from the web, divided by the webspeed. In these examples, the process time was about 0.5 minutes. It is likely that a necessary, though not sufficient, condition for adequate dual side neutralization is that the order of magnitude of electrical relaxation time of the fluid (absolute permittivity divided by conductivity) be less than that of the process time. Comparing the solvent properties with the investigator's limited test results appears to validate this requirement. For example, heptane and toluene do not work well, in accordance with the present disclosure, and do have relaxation times at least an order of magnitude higher than the etstimated process time.

Although water meets the requirement with respect to electrical relaxation time, water was found to not perform well in accordance with the present disclosure. Water with salt added would have a very high conductivity and low relaxation time, but is less effective than the preferred solvents. The wetting/dewetting properties of water with respect to the particular substrate used may play an important role, with all of the well performing solvents having a surface tension less than 25 dyne/cm. However, adding the fluorosurfactant to attain a similar surface tension in water did not provide the good neutralization result desired.

It is thought to be desirable to not include solutes such as surfactants or salts in the neutralizing liquid because they might leave an undesired residue on the neutralized web. An exception to this may be a situation where it is desirable to leave such a residue, in effect combining the neutralization operation with a sort of coating operation.

Other solvents, namely 3M Novec HFE-7100, 7200, and 7500 (highest boiling), were tested on a lab bench scale. In this case, samples of the film web (Scotchpak film) were dipped in a variety of the solvents including:

(1) Good experiments from the webline tests such as acetone, IPA, methanol;

(2) Bad experiments from the webline tests such as DI water, heptane, toluene; and (3) Untested solvents like fluorocarbons 3M Novec HFE-7100, 7200, and 7500 (highest boiling).

In these tests, a sample of the film (about 2 ft long) was unwound from the roll. About half of this length was immersed in the solvent contained in a grounded aluminum casserole pan (similar to the one used in the webline test of FIG. 9). The sample was left in the pan for about 30 seconds prior to removal and dried by hanging up in the quiescent air in the lab. Air drying would take up to several minutes. After drying, the samples were coated with bipolar static powders to visualize whether or not any charge pattern was present on the sample. The method used is described in Harry H. Hull, "A method for studying the distribution and sign of static charges on solid materials", Journal of Applied Physics, volume 20, December 1949, p. 1157-1159.

The result of this testing showed that all of the solvents eliminated the undesirable charge patterns (where immersed) with the static charge patterns obviously apparent in the undipped half of the samples. In other words, with a long enough process time compared to relaxation time combined with symmetric treatment of the sides, even liquids like heptane, toluene and water worked to completely neutralize the web samples. Note that the static powder method does not give absolute static levels but rather visualized general static patterns. Also, the static powder method is necessarily invasive since it involves deposition of charged particles to the web surface.

Tests were also done to show that the methods of this disclosure could also be used to provide a net charge or otherwise modify the charge on a web using a solvent. The apparatus of FIG. 27, described below, was used to modify the charge on the web.

A die 82, in fluid in communication with a syringe mounted in syringe pump 80, was mounted on a Teflon plate to insulate the die from ground. The tubing and syringe were made of insulating material, insuring that the fluid was electrically isolated. A roll of web material 84 (2 mil PET web) was provided and fed to a grounded coating roll 86. A conventional static string was used to neutralize the web somewhat prior to coating roll 86. Die 82 applied a continuous coating of isopropyl alcohol (IPA) onto the web, which was then passed into a conventional convection oven 88 for drying.

Figure 27:
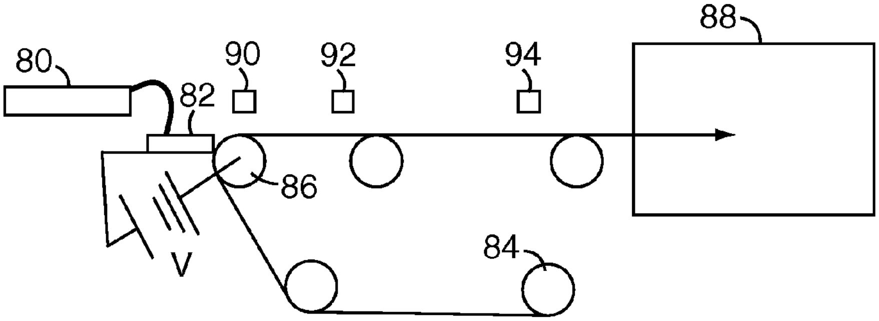
FIG. 27 is a schematic diagram of a second web handling apparatus used for the Examples described in this disclosure.

A handheld meter (3M Corporation, Model 709 static sensor) was used to measure the voltage at locations 90, 92, and 94, shown in FIG. 27. Location 90 measured the top side charge with the bottom approximately at ground. Locations 92 and 94 measured the total web charge.

The web was wetted with IPA on the front side by die 82, back side by, or both sides by die 82. At location 92, the web was generally still wet when IPA was used. At location 94 the web appeared dry to the touch.

The electrical integrity of the system was tested by increasing voltage (V) to die 82 (at 20 mil gap) until arcing occurred. It was found that no current leakage occurred provided the voltage drop was <4000 volts. The runs presented here were done at a die voltage (V) of 1 kV.

Six runs were done and are reported here:

(1) Control—Dry run. No IPA, no charging.

(2) IPA back (V=0)—IPA was squirted on the back side of the web just prior to the coating roll. No IPA coating at die, no charging.

(3) IPA front (V=0)—IPA coated from die on top side. No charging, no back-side IPA.

(4) IPA front/back (V=0)—IPA coated on top, sprayed on back side. No charging.

(5) IPA front (V=1000V)—IPA coated on top at 1000V. No IPA on back-side.

(6) IPA front/back (V=1000)—IPA coated on top at 1000V, IPA sprayed on back-side.

The gap was set at 20 mils with an IPA flow rate of 1.5 ml/min. The voltage measurements from these runs are given in the table below.

| Run | Station | Location 90 (volts) | Location 92 (volts) | Location 94 (volts) |
|---|---|---|---|---|
| 1 | Control web | 0 | 50-200 | 700-900 |
| 2 | IPA back (V = 0) | 3-5 | 3-5 | 250-300 |
| 3 | IPA front (V = 0) | 5 | 200-250 | 700-800 |
| 4 | IPA front/back (V = 0) | −5 | −6 | 10 |
| 5 | IPA front (V = 1000 V) | 1000 | 1500 | 2300 |
| 6 | IPA front/back (V = 1000 V) | 1000 | 1000 | 1000 |

From the results, it is seen that, provided IPA was wetted on the back side (at ground potential in this case), the web could be "coated" with a potential equal to the applied potential at the die from which IPA was coated. The final dried web had a very uniform robust charge distribution. The role of the IPA on the backside is to provide a stable electrostatic reference point (of ground in this case).

After drying, the web is essentially coated with an electrostatic potential. The present disclosure describes methods and apparatus which provide a web with a specified uniform electrostatic potential. In the case of neutralization, the specified uniform electrostatic potential is zero, or ground. In the case of web charging, the specified uniform electrostatic potential is non-zero. In the neutralization examples, the coating method employed was dip coating, a commonly known method. In the charging experiments, the coating method employed was slot die coating, a commonly known coating method.

In the charging experiments described above, the final charge appeared to be stable in time (did not appear to bleed off), indicating that an additional coating may be applied on top of this "charge coating".

We note here that, in Runs 4 and 6, there was little time variation in voltage at all three locations (including the "dry" location 94), whereas in the other cases (where at least one side of the web was not wetted with IPA) the time fluctuations of the voltage measurements were significant. It appears that both sides of the web should be held at steady potentials for the method to be robust. This may be done by coating a solution on both sides or by ensuring that one side remains at a specified potential by, for example, keeping against a grounded object during processing or, for example by putting a conductive backing against it.

Some example applications include the following. Dual side meniscus coating (both dies grounded) of a web in free span prior to the coating roll, allowing time for the IPA to dry prior to the coating roll. In this case the web should enter the coating station with a zero top-side and bottom-side charge, and only the tribocharging of the web coming off the coating roll should be an issue. It is possible that residual IPA on the back-side could mediate somewhat this tribocharging effect.

Alternatively, one could pre-coat charges using a voltage drop between the two meniscus dies. This could give a much more uniform "charge coating" then might be obtained from corona charging of the incoming web. This "charge coating" technique might also be useful in mediating the effect of imbedded charges in insulating fluids.

Figure 28:
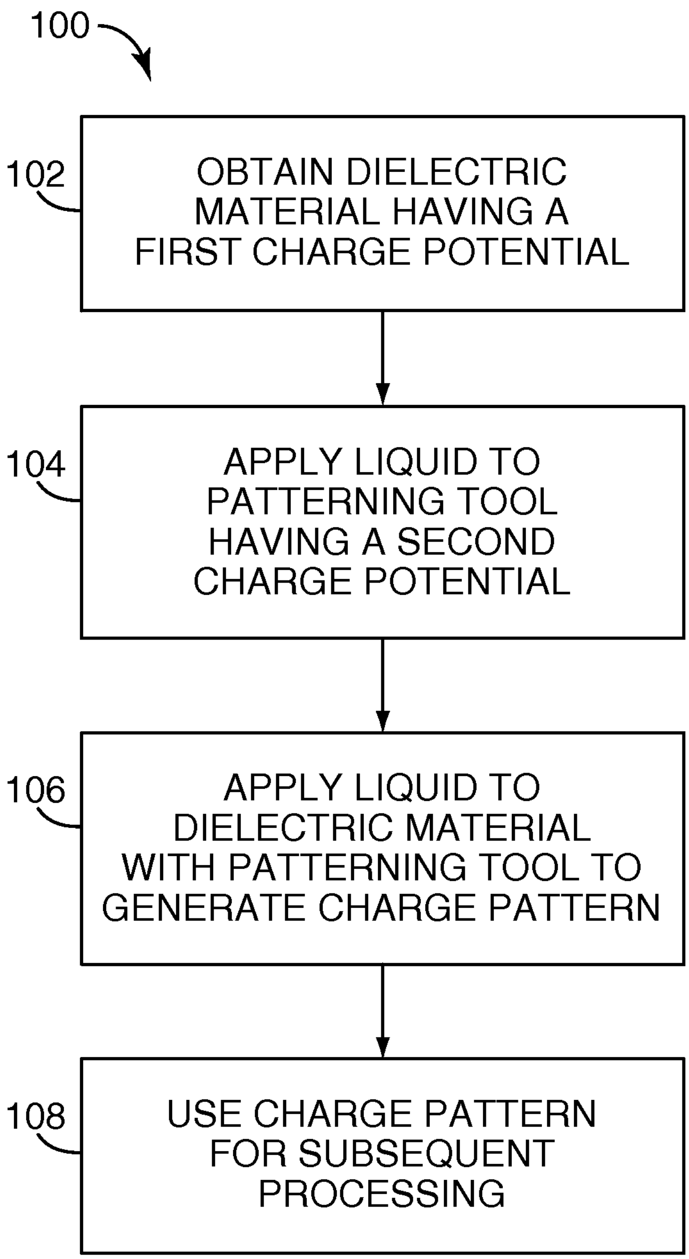
FIG. 28 is a flow chart illustrating a method of generating an electrostatic charge pattern on a dielectric material.

FIG. 28 is a flow chart illustrating a method 100 of generating an electrostatic charge pattern on a dielectric material. Method 100 includes operations 102, 104, 106, and 108. In operation 102 a dielectric material is obtained having a first electrostatic charge potential. In some embodiments, the first charge potential applied to the dielectric material, such as with a scorotron. In other embodiments, little or no charge is present on the dielectric material, such that the first charge potential is substantially equal to a ground potential. Although operation 102 is illustrated as occurring before operation 104, another embodiment of method 100 performs operation 102 after operation 104.

Operation 104 is then performed to apply liquid to a patterning tool having a second charge potential. The tool, such as a stamp or cylinder, includes a surface having a three-dimensional profile. For example, some tools include a plurality of ridges separated by recesses. The ridges include a stamping surface that defines a desired pattern. The ridges separate the stamping surfaces to define spaces of the desired pattern. A liquid is applied to the stamping surfaces. In one embodiment, the tool is pressed against or dipped into the liquid. In another embodiment, the liquid is sprayed other otherwise applied to the stamping surfaces.

The liquid is typically at least slightly conductive. In some embodiments, for example, the liquid includes uncured acrylate monomer. In some embodiments the liquid has an electrostatic relaxation time that is less than a process time. In other embodiments, the liquid is one of methanol, ethanol, methyl ethyl ketone, isopropanol, or acetone.

The tool is typically at least slightly conductive, and in some embodiments includes metal. The tool has a second electrostatic charge potential that is different than the first electrostatic charge potential. In some embodiments the tool and associated liquid have little or no charge, such that the electrostatic charge potential is substantially equal to ground. In other embodiments, the second electrostatic charge potential is greater than the first electrostatic charge potential. In yet other embodiments, the second electrostatic charge potential is less than the first electrostatic charge potential.

Operation 106 is then performed to apply the liquid to the dielectric material with the patterning tool to generate an electrostatic charge pattern on the surface of the dielectric material. For example, the tool and applied liquid are pressed against a surface of the dielectric material and at least some of the liquid is transferred from the stamping surface onto the dielectric material. When the liquid is applied to the dielectric material, the electrostatic charge is altered at contact locations.

In some embodiments, the tool and liquid are connected to ground. As a result, the tool and liquid partially or fully neutralize charge at the contact locations. Areas that are not contacted by the tool and liquid do not see a significant alteration of the electrostatic charge.

In other embodiments, the tool and liquid are charged. As a result, the charge is transferred to the dielectric material at contact locations, while remaining areas of the dielectric material do not see a significant alteration of the electrostatic charge.

As a result of the contact between the dielectric material and the liquid and tool, a charge pattern is generated on the surface of the dielectric material.

Operation 108 is then performed during which the charge pattern is used for subsequent processing. For example, the charge pattern is used to attract toner particles to charged regions.

Figure 29:
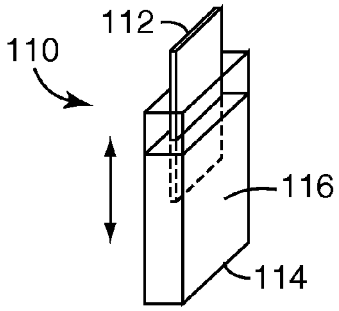
FIG. 29 is a schematic perspective view illustrating a first operation of the method of applying liquid to a patterning tool.
Figure 30:
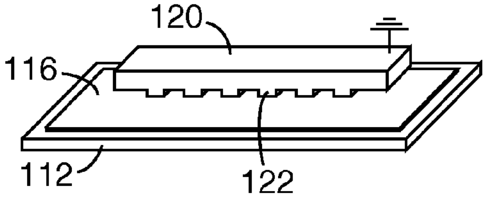
FIG. 30 is a schematic perspective view illustrating a second operation of the method of applying liquid to a patterning tool.
Figure 31:
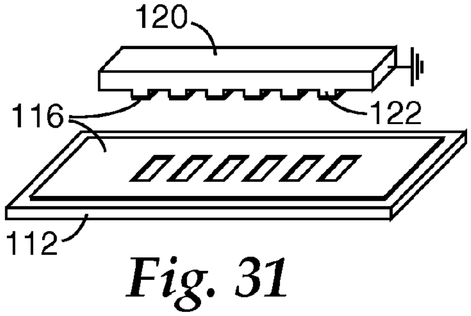
FIG. 31 is a schematic perspective view further illustrating the second operation of FIG. 30.
Figure 32:
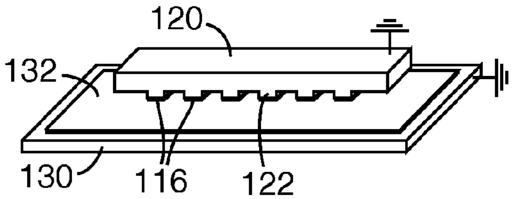
FIG. 32 is a schematic perspective view illustrating a method of applying liquid to a dielectric material from a patterning tool.
Figure 33:
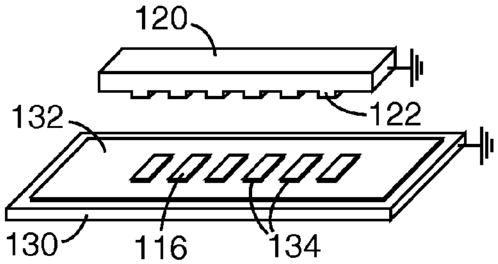
FIG. 33 is a schematic perspective view further illustrating the method of applying liquid to a dielectric material from a patterning tool.

FIGS. 29-33 illustrate an example method of generating a charge pattern on a charged dielectric material. More specifically, FIGS. 29-31 illustrate a method of applying liquid to a patterning tool, such as during operation 104, shown in FIG. 28. FIG. 32-33 illustrate a method of applying the liquid to a dielectric material, such as during operation 106, shown in FIG. 28, to generate the charge pattern.

FIG. 29 is a schematic perspective view illustrating a first operation of a method of applying liquid to a patterning tool. The operation involves sheet 112, container 114, and liquid 116. Sheet 112 is a sheet of material, such as a sheet of glass, a plate of metal, or a sheet of another material. Liquid 116 is contained within container 114. Container 114 is any container suitable for containing liquid 116. In this first operation, sheet 112 is dipped into tank 114 and then removed. Once removed, a thin layer of liquid 116 remains on sheet 112.

FIGS. 30 and 31 are schematic perspective views illustrating a second operation of the method of applying liquid to a patterning tool. The operation involves plate 112, liquid 116, and patterning tool 120. Patterning tool 120 includes stamping surfaces 122.

After the liquid has been applied to the plate (e.g., shown in FIG. 29), the liquid is next transferred to the stamping surface 122 of patterning tool 120. To do so, the stamping surface 122 of patterning tool 120 is pressed against liquid 116 on sheet 112. Patterning tool 120 is then separated from sheet 112. At least some of liquid 116 is transferred onto stamping surface 122. In this embodiment, patterning tool 120 is electrically coupled to ground.

FIGS. 32-33 are schematic perspective views illustrating a method of applying liquid to the dielectric material from a patterning tool. The method occurs after the liquid has been applied to the stamping surfaces 122 of patterning tool 120 (e.g., as described with reference to FIGS. 29-31).

In this embodiment, dielectric material 132 is charged and then placed onto a grounded plate 130, or charged while on a grounded plate 130. For example, a scorotron is used to apply a substantially uniform charge to dielectric material 132. If desired, other charge alteration devices are used to achieve the desired charge. The dielectric nature of material 132 causes charge to remain on a surface of dielectric material 132 despite the presence of grounded plate 130.

Stamping surface 122 of patterning tool 120 is pressed against a surface of dielectric material 132. At least some of the liquid 116 on stamping surface 122 is transferred onto dielectric material 132. At that time, charge present on dielectric material 116 is neutralized by liquid 116 from stamping surface 122. However, charge present on dielectric material 116 that is not contacted by liquid 116 and stamping surface 122 is not neutralized. An electrostatic charge pattern is formed on dielectric material 132 corresponding to the shape and pattern of stamping surface 122 of patterning tool 120.

Other embodiments are useful for applying a charge to a dielectric material, such as using the patterning tool and the liquid. In such embodiments, the patterning tool and associated liquid are charged (such as by electrical coupling to a high voltage power supply) to an electrostatic charge potential that is greater than the electrostatic charge potential of the dielectric material. In some embodiments the dielectric material is uncharged. When the charged liquid is applied to the dielectric material, charge is transferred with the liquid. Even after the liquid has dried, the charge remains on the contacted regions.

Some embodiments allow for charge patterning on the micron-scale at speeds comparable to microflexoprinting processes and can be used to pattern charge on virtually any dielectric substrate, provided the substrate has surface energies compatible with the liquid being deposited. Some embodiments according to the present disclosure include the deposition of charged patterns of, for example, uncured acrylate which can be cured in place after guided deposition of a second material (i.e. nanoparticles). Adhesion to the substrate is of the same quality as that of any cured material. Varieties of monomers, cross-linkers, initiators, and functional components may be used. The liquid need not be highly conductive. As illustrated herein, conductivities in the antistat regime are sufficient to enable adequate charging of the liquid pattern. Some embodiments according to the present disclosure also include the deposition of charged patterns of, for example, common solvents such as isopropyl alcohol or methyl ethyl ketone. The solvents may then be evaporated from the surface leaving a charged pattern on the surface of the dielectric. The charge distribution imparted to the dielectric surface may be uniform or patterned regardless of the type of liquid used to deposit the charge and regardless of whether the liquid is left in place or evaporated.

Examples, FIGS. 34-50

The following non-limiting examples illustrate various embodiments of this disclosure.

FIGS. 34-37 illustrate electrostatic charge potentials on a dielectric material as measured in tests that were conducted. This example shows that charge patterns can be generated by depositing uncured acrylate monomer from a grounded conductive tool onto a charge dielectric material.

The measurements of the dielectric potential were mapped by a Trek Model 400 electrostatic voltmeter with a Trek Model 401P-E high-speed probe mounted to a manual xy stage. A probe to sample gap of about 1 mm was used.

Figure 34:
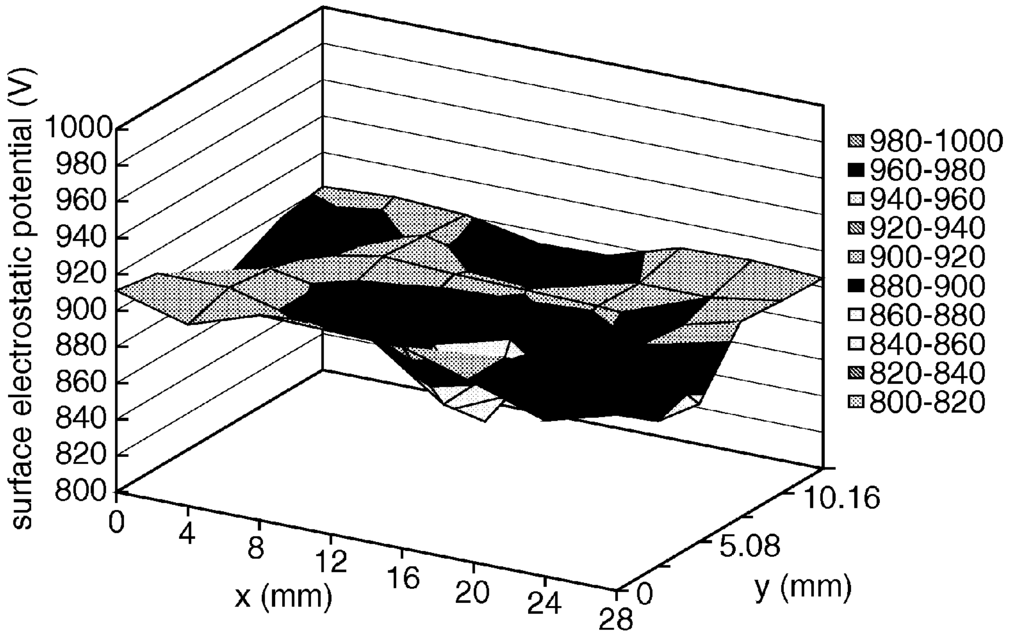
FIG. 34 is a plot of electrostatic charge potential on a dielectric material as measured in tests that were conducted.

FIG. 34 is a plot of electrostatic charge potential on the dielectric material after charging the dielectric material. Charging was performed using a custom built 10" scorotron. The screen of the scorotron was grounded through a 2 MOhm resistor. The corona-emitting electrode (a gold-plated saw-tooth blade) was held at a specified voltage using a Glassman +10 kV, 30 mA high voltage DC power supply. The 2 MOhm resistor causes the screen of the scorotron to be maintained at a potential which is a function of the applied voltage to the scorotron blade. The dielectric material was taped to a top surface of a grounded aluminum plate, and was passed under the scorotron device. A gap of about 1 mm was between the scorotron and the dielectric material. This caused the top surface of the dielectric material to be charged to approximately the scorotron screen potential.

In this step the scorotron charging device was charged to a blade potential of +7 kV. As shown in FIG. 34, the resulting charged dielectric material had a surface potential on the order of about 900 volts.

Figure 35:
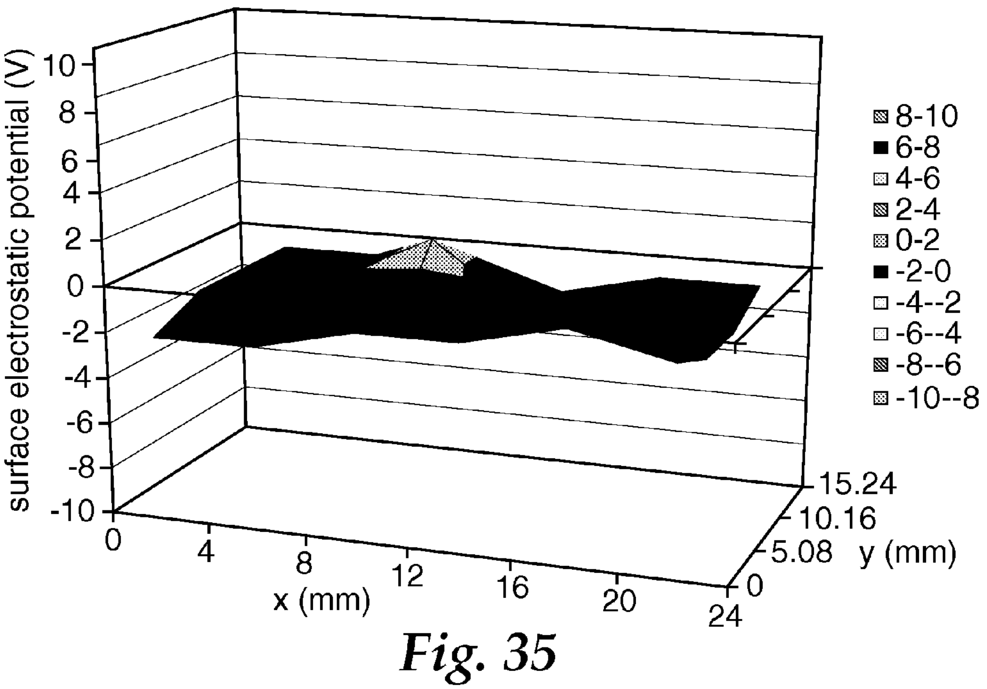
FIG. 35 is a plot of electrostatic charge potential after neutralizing the dielectric material shown in FIG. 34.

FIG. 35 is a plot of electrostatic charge potential after removing charge from the dielectric material. After charging the dielectric material as shown in FIG. 34, charge was substantially removed from the dielectric material. As shown in FIG. 35, the resulting charge potential of the dielectric material was about zero volts.

Figure 36:
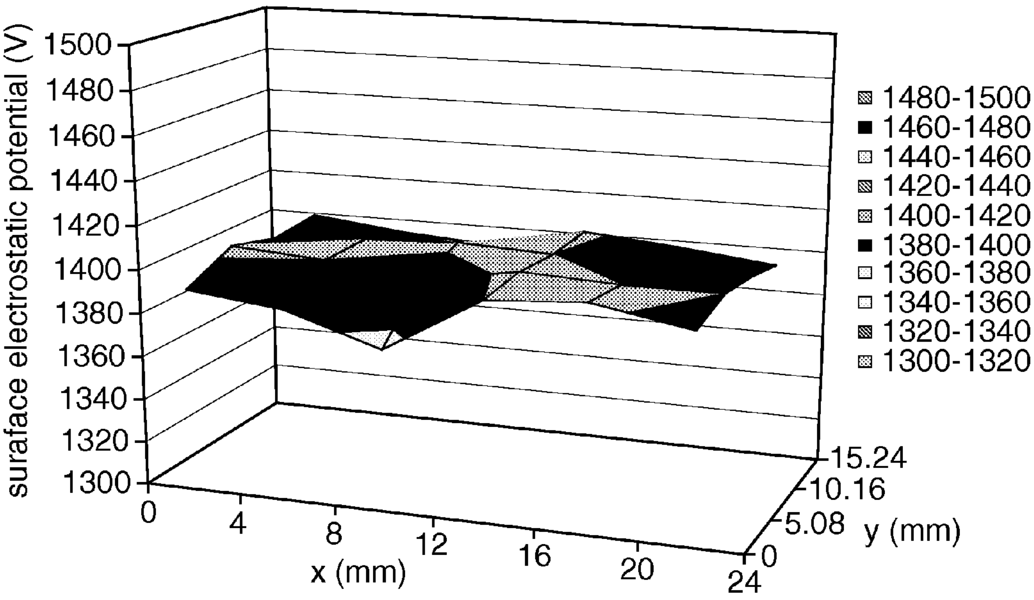
FIG. 36 is a plot of electrostatic charge potential after recharging the dielectric material shown in FIG. 35.

FIG. 36 is a plot of electrostatic charge potential after recharging the dielectric material. In this step, the scorotron charging device was again used, but this time with a blade potential of +8 kV. As shown in FIG. 36, the resulting charge dielectric material had a surface potential on the order of about 1400 volts.

Figure 37:
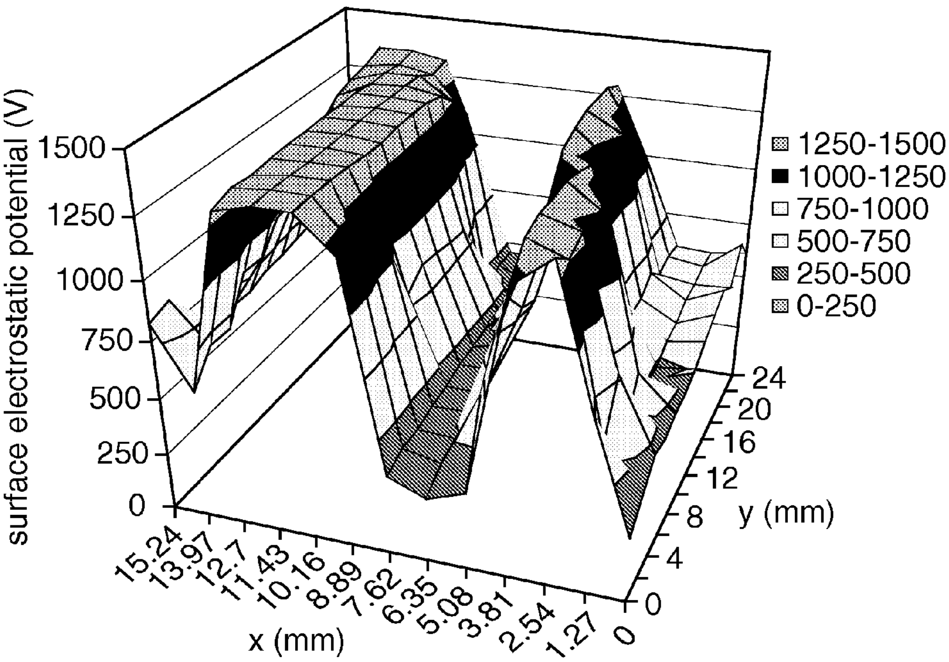
FIG. 37 is a plot of electrostatic charge potential of a dielectric material after stamping with a liquid coated patterning tool.

FIG. 37 is a plot of electrostatic charge potential of the dielectric material after stamping with a liquid coated patterning tool. The patterning tool was made from a conductive material having two ribs spaced approximately 5 mm apart. The tool was electrically coupled to ground.

A thin coat of acrylate monomer was applied to stamping surfaces of the patterning tool through the process illustrated in FIGS. 29-31. Acrylate monomer has a conductivity on the order of $10^{-10}$ S/m. The stamping surfaces of the patterning tool were then pressed against the charged dielectric material and removed.

The resulting electrostatic charge potential is illustrated in FIG. 37. The resulting electrostatic charge potential includes a pattern of charged regions and less-charged regions. The charged regions (e.g., x from about 1 to 2 mm and from 9 to 12 mm) have an electrostatic potential of about 1400 volts, while the less-charged regions (e.g., x at about 0 mm and about 6 mm) have an electrostatic potential of about 300 volts. Therefore, the regions that were contacted by the patterning tool and the acrylate monomer have a reduced charge than areas that were not contacted by the patterning tool and the acrylate monomer.

FIGS. 38-50 illustrate electrostatic charge potentials on a dielectric material as measured in tests that were conducted. These examples show that charge patterns can be generated by depositing uncured acrylate monomer from a charged patterning tool onto a relatively uncharged dielectric material. The charged acrylate monomer can then be used to attract toner particles.

Figure 38:
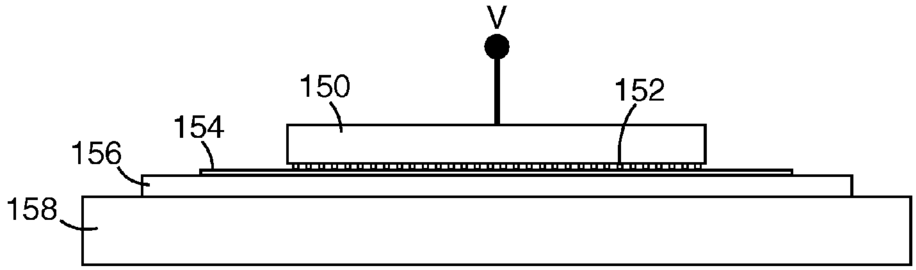
FIG. 38 is a schematic side block diagram illustrating a first operation of a method of generating charge patterns.
Figure 39:
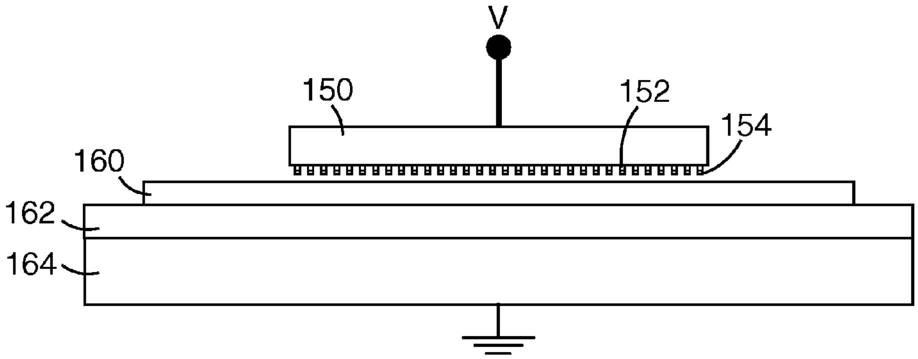
FIG. 39 is a schematic side block diagram illustrating a second operation of the method of generating charge patterns.
Figure 40:
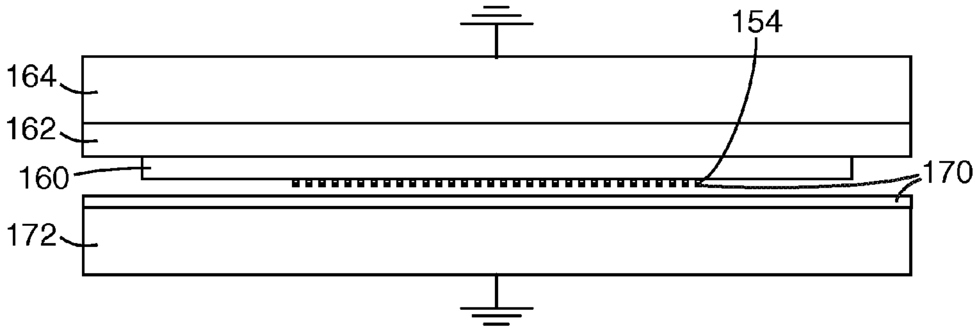
FIG. 40 is a schematic side block diagram illustrating a third operation of the method of generating charge patterns.

FIGS. 38-40 illustrate a method of generating charge patterns on dielectric material 160 that is capable of attracting toner particles. In these tests a patterning tool 150 was used.

Figure 41:
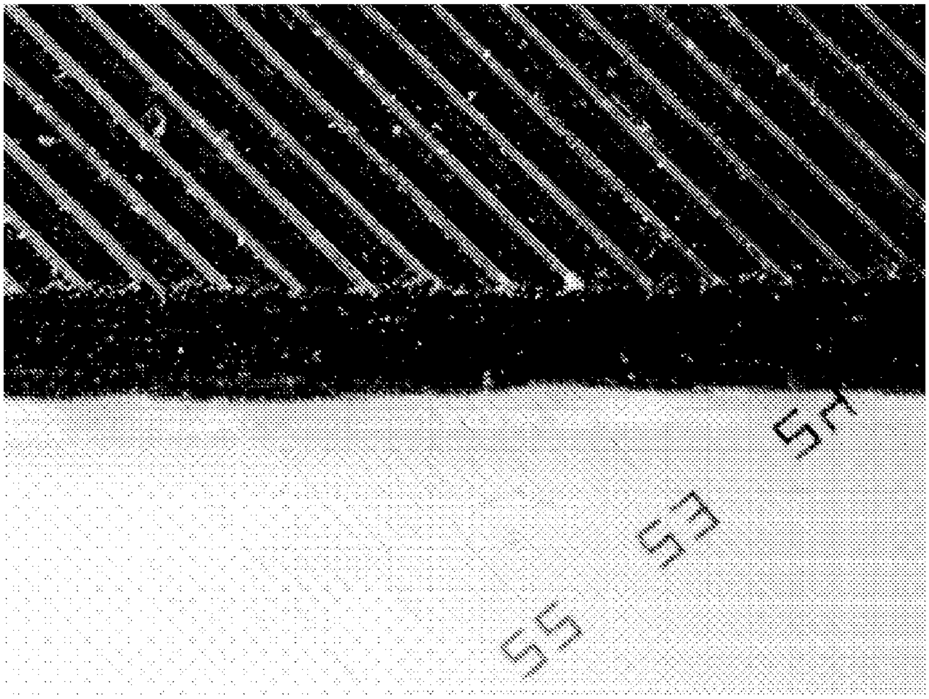
FIG. 41 is a view of a stamping surface of the patterning tool used in some tests that were conducted.

The patterning tool was a piece of gravure roll material with flat features having a width of approximately 100 micrometers. A portion of the tool is shown in FIG. 41.

FIG. 38 is a schematic side block diagram illustrating a first operation of the method of generating charge patterns. The operation involved patterning tool 150 having stamping surface 152, a liquid 154, a dielectric material sheet 156, and plate 158.

The dielectric material sheet 156 was placed on top of plate 158. Liquid 154 was placed on top of dielectric material sheet 156. In this example liquid 154 was acrylate monomer. Patterning tool 150 was electrically coupled to a voltage source, which was a +10 kV, 30 mA high voltage DC power supply. The patterning tool 150 was pressed into liquid 154 such that liquid 154 coated stamping surface 152. Patterning tool 150 was then removed from liquid 154.

FIG. 39 is a schematic side block diagram illustrating a second operation of the method of generating charge patterns. The operation involved patterning tool 150, liquid 154, dielectric material 160, pad 162, and plate 164. Plate 164 was a metal plate that was electrically coupled to ground. Pad 162 was mounted on a rubber pad 162. Dielectric material 160 was mounted on rubber pad 162. Patterning tool 150 included a stamping surface 152 having a coating of liquid 154 as described above.

Stamping surface 152 was pressed against patterning tool 150 to apply liquid 154 to the surface of dielectric material 160. Patterning tool 150 was then removed from dielectric material 160. Some of liquid 154 remained on the surface of dielectric material 160.

Although FIG. 39 shows the use of pad 162, some tests were conducted without pad 162. As described below, the use of pad 162 tends to reduce the sharpness of the electric field from charged liquid. Therefore, pad 162 is not required.

FIG. 40 is a schematic side block diagram illustrating a third operation of the method of generating charge patterns. The operation involved dielectric material 160 having patterned liquid 154 thereon, pad 162, and plate 164. In addition, toner 170 and plate 172 were used.

Plate 172 was a metal plate that was electrically coupled to ground. Toner 170 was arranged on top of plate 172.

Plate 164, pad, 162, and dielectric material 160 were turned upside down and placed into close proximity to toner 170. Plate 172 and toner 170 were agitated to facilitate transfer of toner 170 to dielectric material 160.

When dielectric material 160 was placed into close proximity to toner 170, an electric field generated by patterned and charged liquid 154 on dielectric material 160 caused toner particles 170 to be attracted to and stick to charged liquid 154.

FIG. 41 is a portion of patterning tool 150 that were used in some tests. Patterning tool 150 includes features having a width of about 100 micrometers. A gap separates adjacent features.

Figure 42:
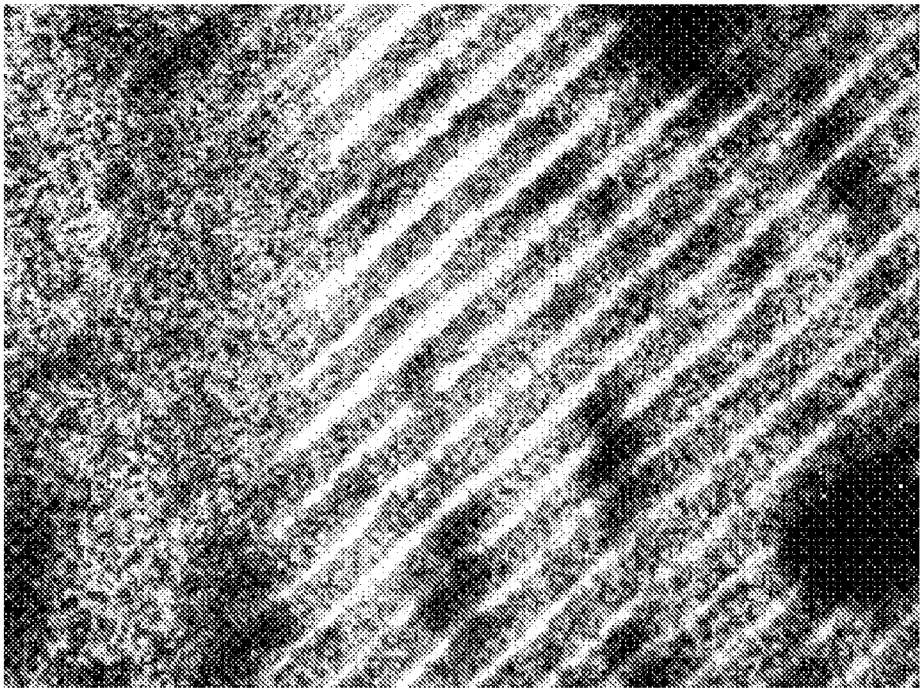
FIG. 42 is a photograph of the dielectric material after having been placed into close proximity to toner particles during a test.
Figure 43:
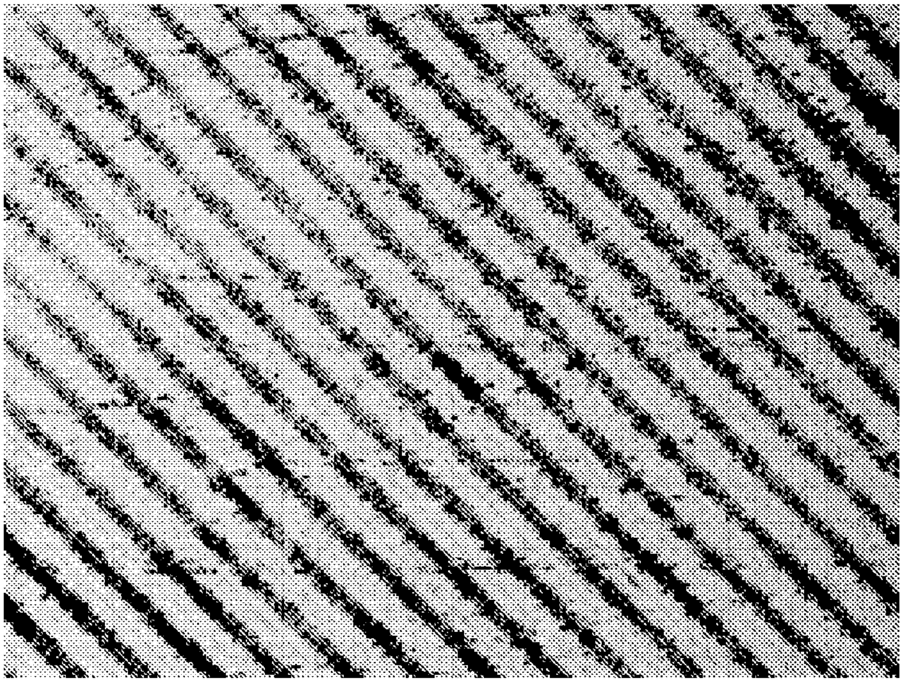
FIG. 43 is a photograph of the dielectric material after having been placed into close proximity to toner particles during another text.
Figure 44:
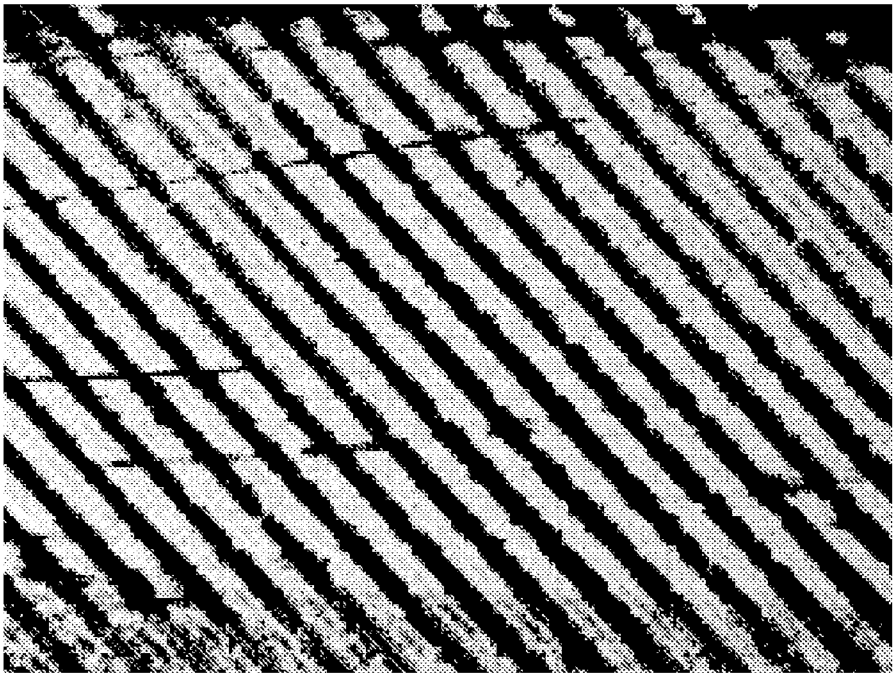
FIG. 44 is a photograph of another portion of the dielectric material shown in FIG. 43.
Figure 45:
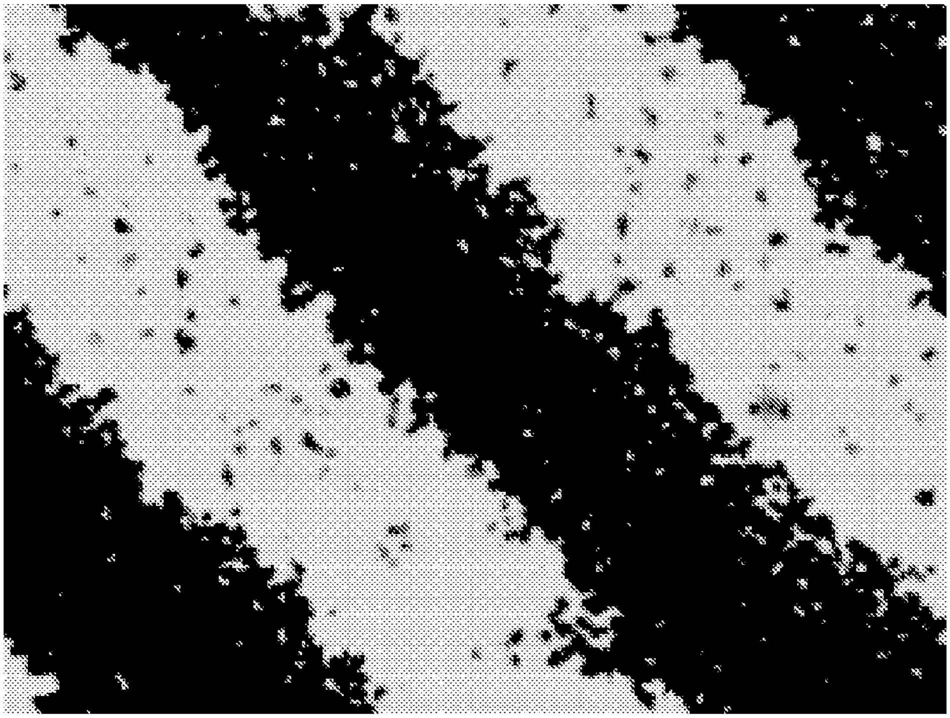
FIG. 45 is a photograph at higher magnification of the dielectric material shown in FIG. 44.
Figure 46:
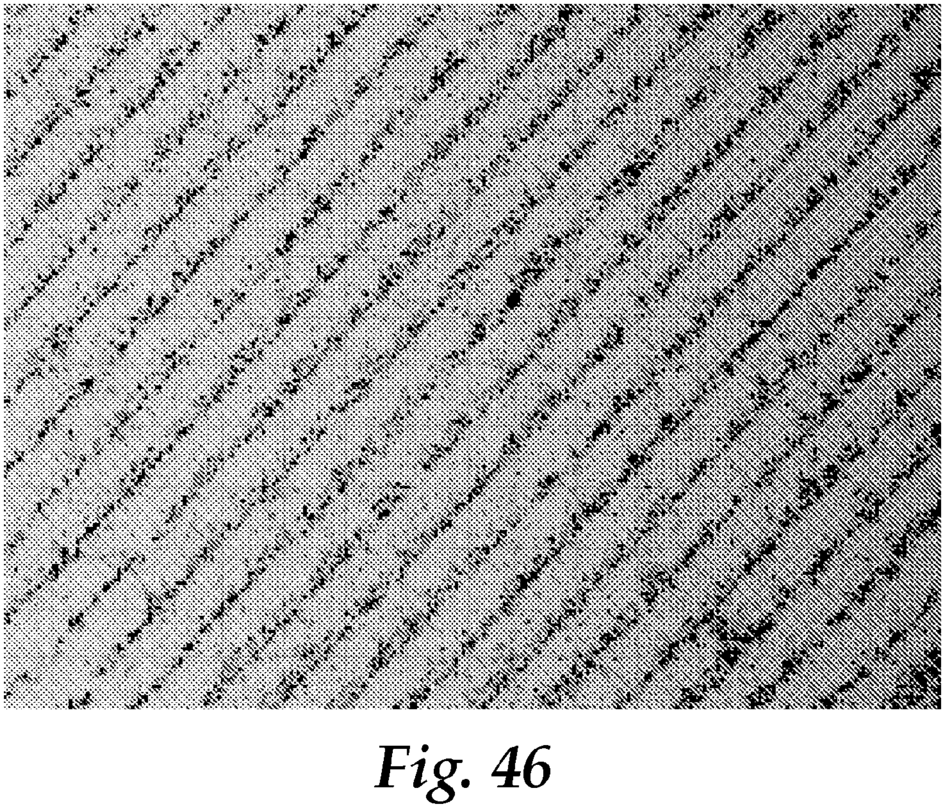
FIG. 46 is a photograph of a dielectric material after having been placed into close proximity to toner particles during another test.
Figure 47:
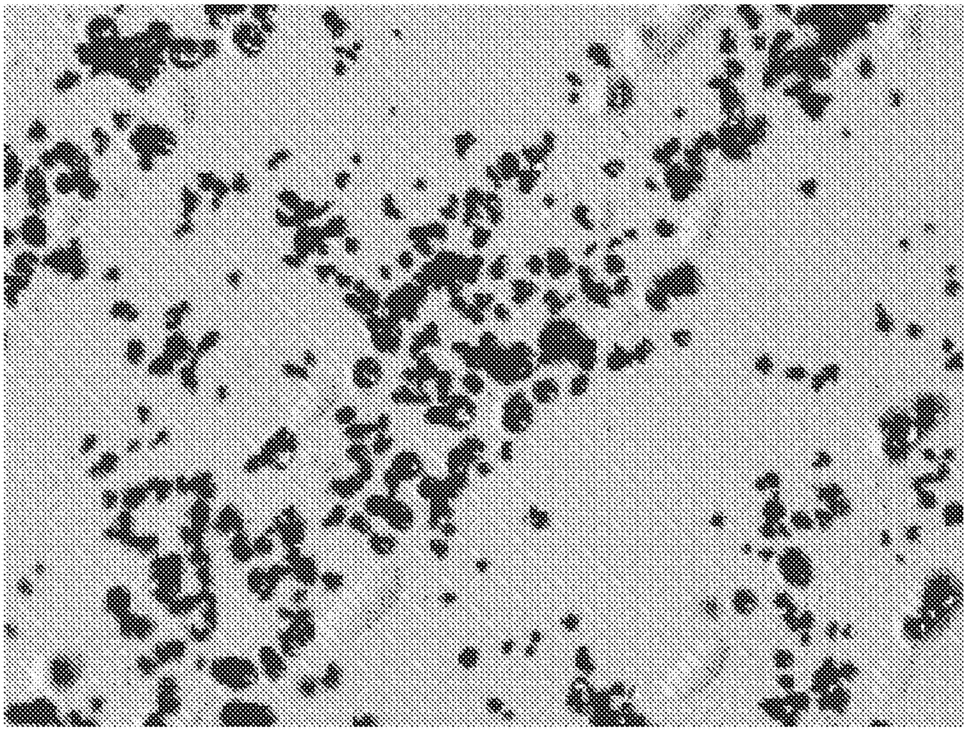
FIG. 47 is a photograph at higher magnification of a single toner trace of the dielectric material shown in FIG. 46.

FIGS. 42-47 illustrate the results of three separate tests conducted as described with reference to FIGS. 38-40 and using the patterning tool shown in FIG. 41. The results of the first test are illustrated in FIG. 42. The results of the second test are illustrated in FIGS. 43-45. The results of the third test are illustrated in FIGS. 46-47.

FIG. 42 is a photograph of the dielectric material after having been placed into close proximity to toner particles during a first test. In the first test, the arrangement of FIGS. 38-40 was used including rubber pad 162. The DC power supply electrically coupled to patterning tool 150 was set to +2 kV. The liquid used (e.g., FIG. 38) was 25% weight percent Accentrum acrylate in Methyl Ethyl Ketone (MEK) coated to about 0.005 inches (0.127 mm) thick.

When the dielectric material was placed in close proximity to the toner, the toner was attracted to the charged liquid pattern. A photograph of the resulting toner traces is shown. An Olympus SZK12 microscope was used to capture the photograph.

FIGS. 43-45 are photographs of the dielectric material after having been placed into close proximity to the toner particles during a second test. In the second test, the arrangement of FIGS. 38-40 was used, except that rubber pad 162 was not used between dielectric material 160 and plate 164. The DC power supply electrically coupled to patterning tool 150 was set to +1 kV. The liquid was a 5% weight percent Accentrum acrylate in MEK coated to 0.005 inches (about 0.127 mm) thick. FIGS. 43 and 44 are photographs of two different regions of dielectric material 160 including toner traces. FIG. 45 is a higher magnification image of a single toner trace on the dielectric material 160.

FIGS. 46-47 are photographs of the dielectric material after having been placed into close proximity to the toner particles during a third test. In the third test, the arrangement of FIGS. 38-40 was used. The DC power supply electrically coupled to patterning tool 150 was set to +1 kV. The liquid was a 5% weight percent Accentrum acrylate in MEK coated to 0.005 inches (about 0.127 mm) thick. FIG. 46 is a photograph of the toner traces on the dielectric material obtained in this test. FIG. 47 is a magnified view of a single toner trace obtained in this test.

Figure 48:
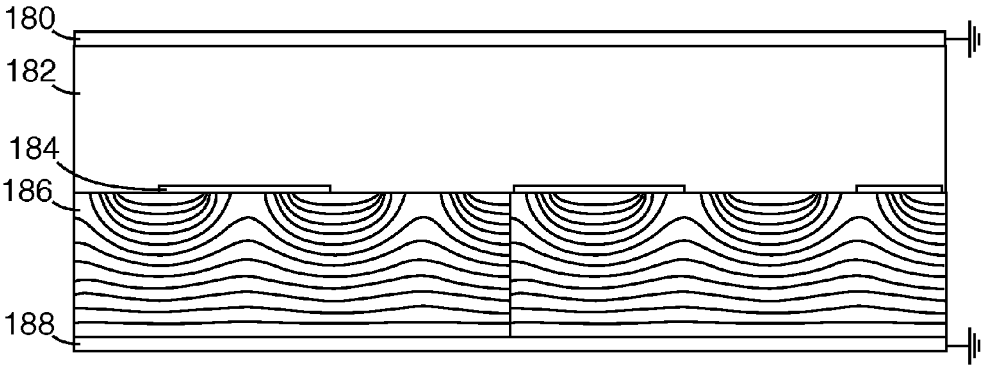
FIG. 48 is a schematic side block diagram illustrating an electric field emanating from charged liquid on a dielectric material having a first thickness.
Figure 49:
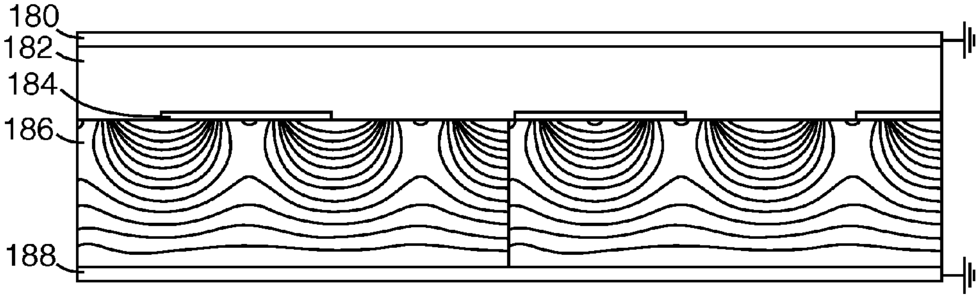
FIG. 49 is a schematic side block diagram illustrating an electric field emanating from charged liquid on a dielectric material having a second thickness.
Figure 50:
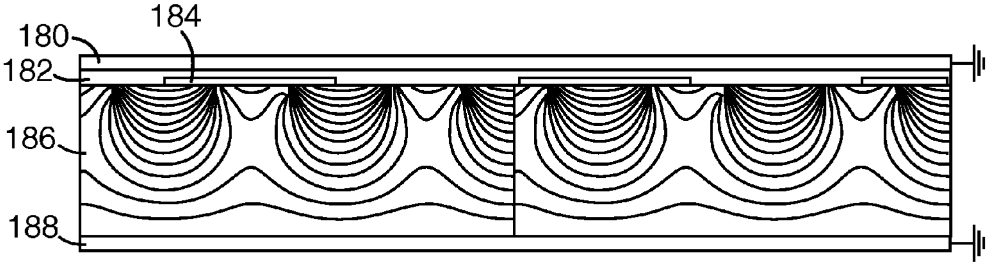
FIG. 50 is a schematic side block diagram illustrating an electric field emanating from charged liquid on a dielectric material having a third thickness.

FIGS. 48-50 illustrate the effect of dielectric material thickness on electric fields emanating from charged liquid 184 on a dielectric material 188. The experimental setup was designed to model the system shown in FIG. 40 without toner 170 and with dielectric material 160 and pad 162 combined into a single dielectric layer.

FIGS. 48-50 qualitatively illustrate the effect of pad thickness on the electric fields. In this example, the dielectric material was mounted to a conductive plate 180. The conductive plate was electrically coupled to ground. Charged and patterned liquid 184 was applied to dielectric material 182. A second conductive plate 188 was spaced from the dielectric material and the patterned liquid. The second conductive plate 188 was also electrically coupled to ground. The electric field in the space between dielectric material 182 and the second conductive plate 188 was measured as shown in FIGS. 48-50. The results show that the electric field is sharper and more focused with a thinner dielectric material (FIG. 50) than with a thicker dielectric material (FIG. 48). This suggests that sharper images will result with thinner dielectric materials.

Similarly, these tests indicate that sharper and more focused images will result from a thin dielectric pad without an adjacent rubber pad (e.g., 162 shown in FIGS. 39 and 40), although this was not specifically tested.

The above specification and examples are believed to provide a complete description of the manufacture and use of particular embodiments. Because many embodiments can be made without departing from the spirit and scope of the disclosure, the true scope and spirit of the disclosure reside in the broad meaning of the claims hereinafter appended.

What is claimed is:

1. A method of modifying charge on a dielectric material, the method comprising:

obtaining a dielectric material having a substantially non-uniform electrostatic charge distribution on a surface, the electrostatic charge distribution measured relative to a ground potential;

applying an at least weakly conductive liquid to the surface of the dielectric material; and at least partially removing the at least weakly conductive liquid from the surface leaving a substantially uniform electrostatic charge on the surface.

2. The method of claim 1, wherein the at least weakly conductive liquid is applied having a potential in a range from about negative 10,000 volts to about positive 10,000 volts.

3. The method of claim 1, wherein the at least weakly conductive liquid is applied having a voltage substantially equal to the ground potential.

4. The method of claim 1, wherein the liquid is one of methanol, ethanol, methyl ethyl ketone, isopropanol, acetone, or an acrylate.

5. The method of claim 1, wherein the liquid has a dielectric constant in a range from about 10 to about 40.

6. The method of claim 1, wherein the liquid has an electrostatic relaxation time that is less than a process time, wherein the electrostatic relaxation time is less than about $3\times10^{-5}$ seconds.

7. The method of claim 1, wherein the weakly conductive liquid is applied in a pattern, and wherein the uniform electrostatic charge on the surface is arranged in the pattern.

8. A method of generating an electrostatic charge pattern on a dielectric material, the method comprising:

obtaining a dielectric material having a first charge potential;

applying an at least weakly conductive liquid to a first portion of the dielectric material, the at least weakly conductive liquid having a second charge potential; and at least partially removing the liquid from the first portion of the dielectric material leaving a substantially uniform electrostatic charge on the first portion of the dielectric material.

9. The method of claim 8, wherein the dielectric material comprises a web.

10. The method of claim 8, wherein the dielectric material has a length of at least 3 meters.

11. The method of claim 8, wherein obtaining a dielectric material having a first charge potential comprises:

obtaining the dielectric material having a non-uniform charge potential; and substantially neutralizing charge on the dielectric material, such that the dielectric material has an average charge potential of about zero volts.

12. The method of claim 11, wherein substantially neutralizing charge is performed by a neutralization system selected from the group consisting of an air ionizer, an electrical static eliminator, an induction static eliminators, and a nuclear static eliminator.

13. The method of claim 8, wherein the dielectric material is moving while applying the liquid to the dielectric material.

14. The method of claim 8, further comprising placing the dielectric material into close proximity to toner particles, such that an electric field generated by the uniform electrostatic charge attracts toner particles.

15. The method of claim 14, further comprising at least one of: curing the toner particles onto the dielectric material, and placing a second material onto the dielectric material to transfer the toner particles to the second material and removing the second material from the dielectric material.

16. The method of claim 8, wherein applying the liquid to the first portion comprises:

applying the liquid to a patterning tool, wherein the patterning tool is at the second charge potential; and applying the liquid to the dielectric material from the patterning tool.

17. The method of claim 16, wherein applying liquid to a patterning tool comprises:

obtaining a sheet of material;

immersing the sheet of material into the liquid;

removing the sheet of material from the liquid such that a coating of liquid remains on a surface of the sheet; and contacting the coating of liquid from the surface of the sheet to transfer a portion of the coating of liquid onto the patterning tool.

18. The method of claim 8, wherein removing the liquid from the first portion comprising removing the liquid using one of evaporation, a heater, an infrared heater, a convection oven, a wick, a wiper, a squeegee, an air knife, a microwave, an air convection system.

19. The method of claim 8, wherein the liquid comprises an acrylate, and wherein removing the liquid from the first portion comprising drying the acrylate onto the dielectric surface.

20. A method for neutralizing an elongate web of dielectric material, the method comprising:

electrically coupling an at least weakly conductive liquid to a ground potential;

obtaining a dielectric material having a charge potential that is not entirely substantially equal to the ground potential;

immersing a portion of the continuous web in the liquid to completely cover the portion of the elongate web to neutralize charge on the elongate web;

removing the portion of the continuous web from the liquid; and at least partially drying the liquid from the continuous web after immersing.

* * * * *